United States Patent
Busjaeger et al.

(10) Patent No.: US 11,526,539 B2
(45) Date of Patent: Dec. 13, 2022

(54) TEMPORARY RESERVATIONS IN NON-RELATIONAL DATASTORES

(71) Applicant: salesforce.com, inc., San Francisco, CA (US)

(72) Inventors: Benjamin Busjaeger, San Francisco, CA (US); Michael Sgroi, San Francisco, CA (US); Jeremy Horwitz, San Francisco, CA (US)

(73) Assignee: SALESFORCE, INC., San Francisco, CA (US)

( * ) Notice: Subject to any disclaimer, the term of this patent is extended or adjusted under 35 U.S.C. 154(b) by 16 days.

(21) Appl. No.: 16/264,367

(22) Filed: Jan. 31, 2019

(65) Prior Publication Data

US 2020/0250210 A1    Aug. 6, 2020

(51) Int. Cl.
*G06F 16/31* (2019.01)
*G06F 16/16* (2019.01)

(52) U.S. Cl.
CPC .......... *G06F 16/328* (2019.01); *G06F 16/162* (2019.01)

(58) Field of Classification Search
CPC .............................. G06F 16/328; G06F 16/162
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |

(Continued)

FOREIGN PATENT DOCUMENTS

EP    3266147 B1    9/2019

OTHER PUBLICATIONS

Fiorano Event Tracking Published on Dec. 6, 2017 https://www.fiorano.com/documentation/display/ESB1100/Events+Tracking.*

*Primary Examiner* — Hosain T Alam
*Assistant Examiner* — Chongsuh Park
(74) *Attorney, Agent, or Firm* — Schwabe Williamson & Wyatt

(57) ABSTRACT

Systems, methods, and computer-readable media for temporary reservation schemes, are provided. In embodiments, temporary reservations are inserted into non-relational datastore, and update records indicating changes to the non-relational datastore are streamed to processing nodes. The processing nodes store the update records in local expiration windows. The expiration windows are periodically polled for expired temporary reservations, which are then removed from the non-relational datastore. Other embodiments may be described and/or claimed.

20 Claims, 8 Drawing Sheets

(56) References Cited

U.S. PATENT DOCUMENTS

| | | |
|---|---|---|
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,850,453 B1 * | 9/2014 | Zhang .................... G06F 9/451 719/313 |
| 10,282,175 B2 | 5/2019 | Busjaeger |
| 10,474,562 B2 | 11/2019 | Donaldson |
| 10,608,961 B2 | 3/2020 | Kwong |
| 10,719,533 B2 | 7/2020 | Busjaeger |
| 10,832,309 B2 | 11/2020 | Busjaeger |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |

(56) References Cited

U.S. PATENT DOCUMENTS

| | | |
|---|---|---|
| 2007/0174694 A1 | 7/2007 | Yamamoto et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0017442 A1* | 1/2010 | Kaijima ............... G06F 9/542 707/E17.005 |
| 2010/0094997 A1* | 4/2010 | Chou ................ H04W 24/00 709/224 |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0194604 A1* | 8/2013 | Asano ............... H04N 1/00114 358/1.15 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0273909 A1* | 9/2014 | Ballantyne ............. H04W 4/90 455/404.1 |
| 2014/0344453 A1 | 11/2014 | Varney |
| 2014/0359537 A1 | 12/2014 | Jackobson et al. |
| 2015/0213454 A1* | 7/2015 | Vedula ............... G06Q 30/016 705/304 |
| 2016/0077798 A1 | 3/2016 | Pradeep |
| 2017/0103403 A1* | 4/2017 | Chu ................. G06Q 30/0202 |
| 2017/0132291 A1 | 5/2017 | Liu |
| 2018/0210713 A1 | 7/2018 | Busjaeger |
| 2019/0362090 A1 | 11/2019 | Peddada |
| 2020/0073972 A1 | 3/2020 | Busjaeger |
| 2020/0097893 A1 | 3/2020 | Acharya |
| 2020/0110826 A1* | 4/2020 | Lautenschlaeger ......................... G06F 16/24568 |
| 2020/0250013 A1 | 8/2020 | Boran et al. |
| 2020/0250172 A1 | 8/2020 | Busjaeger |
| 2020/0250210 A1 | 8/2020 | Busjaeger |
| 2020/0380000 A1 | 12/2020 | Busjaeger |

* cited by examiner

TEMPORARY RESERVATIONS IN NON-RELATIONAL DATASTORES

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to database systems, and in particular to non-relational datastores for temporary reservation schemes.

BACKGROUND

In multi-tenant database systems, customer organizations (also referred to as "tenants") may share database resources in one logical database. The databases themselves are typically shared, and each tenant is typically associated with an organization identifier (org ID) column or field that may be used to identify rows or records belonging to each tenant. Each tenant may provide their own custom data, which includes defining custom objects and custom fields, as well as designating one or more custom fields to act as custom index fields. Users of a multi-tenant database system (e.g., agents of a particular organization or tenant) may obtain data from an associated tenant space, which may be used to render/display visual representations of relevant tenant data.

Temporary reservations are used in many business use cases to reserve some item for some period of time, which is usually a relatively short period of time. Temporary reservation schemes are difficult to implement using conventional relational database and non-relational database techniques because of the short-lived nature and high throughput requirements needed to implement temporary reservation schemes.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 4 shows logical interactions between the elements of FIGS. 1A-3 for storing temporary reservations and expiring stored temporary reservations according to various embodiments, and FIG. 5 shows example logical interactions between the elements of FIGS. 1A-3 for obtaining expiration times for temporary reservations according to various embodiments.

DETAILED DESCRIPTION

Figure 1A:
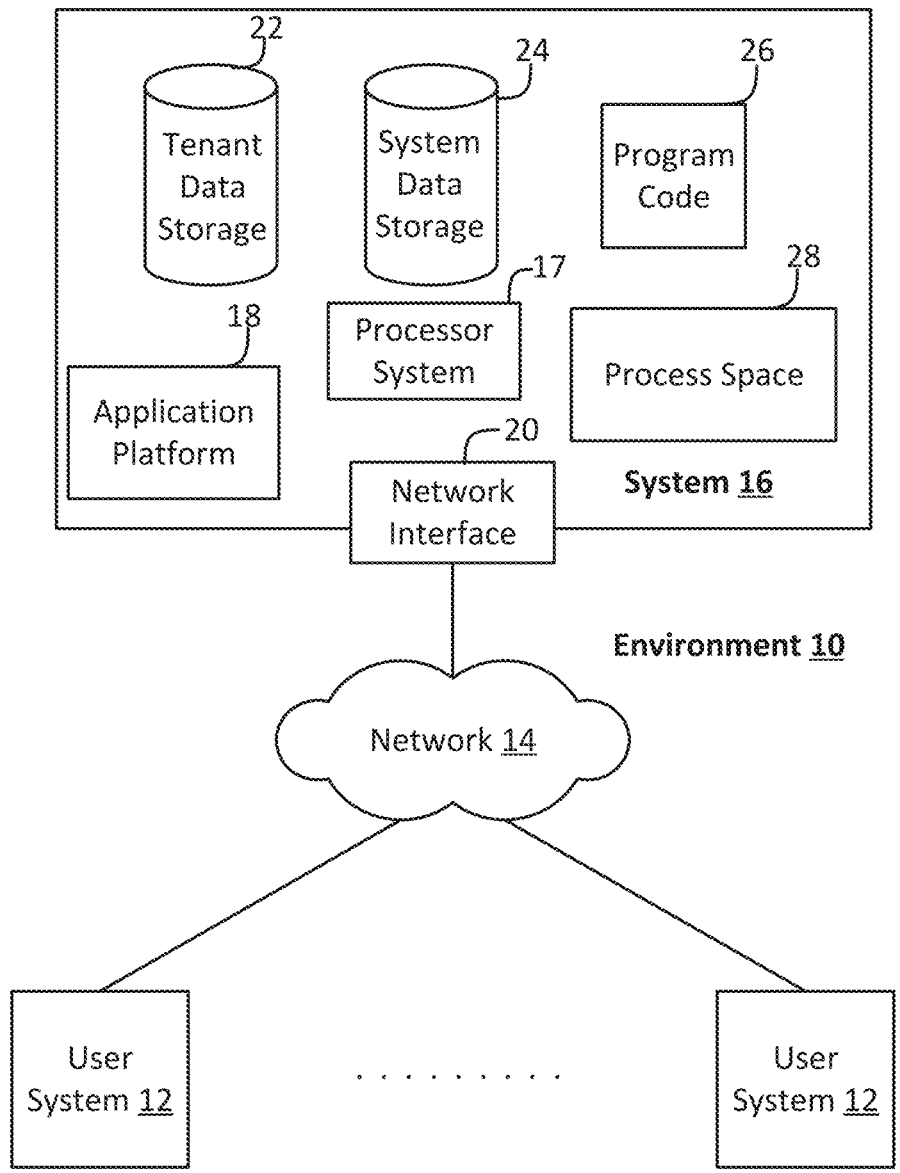
FIG. 1A shows a block diagram of an example environment in which an on-demand database service can be used according to some implementations.

Embodiments discussed herein provide non-relational datastore technologies for implementing temporary reservation schemes. Non-relational datastores (also referred to as "NoSQL" datastores) provide mechanisms for storage and retrieval of data using means other than tabular relations used in relational databases. Non-relational datastores may provide performance efficiencies (e.g., increased read/write speeds, better scalability, lower maintenance costs, etc.) in comparison to relational databases, but many non-relational datastores may not provide some critical capabilities that are provided by relational databases (e.g., integrity protection).

Temporary reservations are used for many business cases, such as flash or hype sales, where merchants have targeted sales with a limited inventory where there is a high demand for the inventory or the merchant wants to push out large quantities of the inventory in a relatively short period of time. For example, an online retailer having a stock of 500 widgets may want to start a sale on a certain date at a certain time where the widgets will be sold for a certain discount price for the first thirty minutes. Another example includes an event ticket vendor where there are a limited number of tickets that can be sold for a particular event. In order to have these types of flash sales work properly, when a user adds an item to an online shopping cart, that item needs to be reserved for a certain period of time so that the user can complete the checkout process and be sure that the item will not be reallocated and purchased by another user. However, these reservation schemes are difficult to implement using conventional relational database and non-relational database techniques because of the short-lived nature and high throughput requirements needed for such reservation schemes.

For example, a first conventional reservation scheme includes using a relational database with the Cron Java framework for creating triggers (CronTrigger) for scheduling Cron Jobs. CronTriggers are used to create firing schedules, such as: "At 8:00 am every Monday through Friday". These triggers are stored in the relational database with a secondary index on a time field, and a job periodically runs to query the database to determine which items have expired (e.g., by comparing a current time with the stored trigger time). When the item is expired, the trigger is fired by removing the trigger's record from the database and executing code that was stored in the trigger record. However, these schemes do not scale to high throughput scenarios, such as when a flash/hype sale is taking place, because the relational database is often stored in/on a same node.

A second conventional reservation scheme involves using the concepts of the first solution with a NoSQL datastore instead of using a relational datastore. This means storing triggers in a secondary time-based index of a table. It is possible to implement this scheme using a NoSQL datastore because many NoSQL datastores allow users to define secondary indexes on a table. However, these schemes also have issues scaling for high throughput scenarios. This is because this scheme requires the secondary index to be sortable in order to find the appropriate triggers in the table. Sorting means that the secondary index has to partition data onto different shards, and each of the NoSQL nodes will take part in the partitioning. Range-based partitioning would likely be used to enable higher throughput, for example, by having a first NoSQL node take a partition of data stored during a first time range, a second NoSQL node take a partition of data stored during a second time range, and so forth. The problem is that, in flash/hype sale scenarios, most or all of the data will be stored in a latest partition because users will be placing reservations having a same expiration period within a short period of time. This means that all of the items with the related time window will go into the same partition, thereby resulting in the same bottleneck scenario that was meant to be avoided in the first relational database scheme.

Another problem with using secondary indexes in NoSQL datastores effectively requires a second table in the datastore. For example, for online shopping use cases, the primary key in shopping cart applications would typically be a shopping cart identifier (ID) or some application-defined ID, and the secondary index would be the time-based index as discussed previously. However, using a time-based index results in using twice as many resources for storage and twice as many resources for write operations, when compared to using some other type of index.

Disclosed embodiments use a stream-based approach to resolve the throughput and scalability issues that arise when using conventional relational database and convention non-relational database techniques for temporary reservation schemes. In embodiments, a system includes a web tier including one or more reservation processors, a stream tier including one or more expiration processors, and a non-relational datastore, such as a key-value datastore, a NoSQL database, or the like. In some embodiments, a number of expiration processors in the stream tier is equal to a number of partitions or nodes in the non-relational datastore.

Under normal circumstances, reservations are submitted by users of an external platform through the web tier, and the reservation processor(s) insert the submitted reservations into a reservation table (or events log) stored by the non-relational datastore. The reservations are records that at least include a reservation ID field and an expiration time field (e.g., a time of day (1:00 pm), or a timestamp when the reservation was received). When a high throughput scenario takes place on the external platform (e.g., when large numbers of users of the customer platform are all placing reservations on items concurrently and/or within a short period of time), the reservation processor(s) insert the reservations into the non-relational datastore in the same manner as under normal circumstances (i.e., during normal or low throughput scenarios). In these embodiments, the non-relational datastore does not have a secondary index on the reservation table, and the reservations are uniformly sharded or otherwise distributed across the database cluster. In an example, if the non-relational datastore has 100 shards (or 100 nodes that store data), then the submitted reservations are uniformly distributed across the 100 shards as they are inserted into the reservation table. The present solution provides scalability through the uniform distribution of the reservations across all nodes in the non-relational datastore.

An update stream is then sent from the non-relational datastore to the stream tier to indicate new and updated reservations. Updates to a reservation may include an indication that a new reservation has been added to the non-relational datastore or an indication that a reservation time of an existing reservation has been extended by the external platform. The update stream comprises asynchronous ("async") change notifications, where each change notification indicate a respective change to the non-relational datastore or the reservation table.

The async change notifications cause the expiration processors to update an in-memory window of expirations of that stream shard by time. For example, if there are 100 partitions in the non-relational datastore, then there will be 100 expiration processors running concurrently, each of which track the expirations for a corresponding partition. Each of the expiration processors continuously load expiration times from their partitions into their own in-memory expiration windows. Each of the expiration processors also periodically run (e.g., every 30 seconds or the like) an expiration job that queries the local expiration window for reservations that have expired, and retrieves locally stored reservation IDs of the expired reservations. The expiration processors then execute a conditional delete command on the non-relational datastore to delete the expired reservations. The condition of the conditional delete command is that the expiration time stored in the reservation table be the same as the expiration time stored in the local expiration window. The condition is used ensure that the reservation has not been extended by the external platform after that reservation was loaded into the local expiration window.

In some embodiments, the external platform may extend a reservation so that a user may complete a checkout process for purchasing the reserved item. In this case, the external platform may send a request to extend a reservation to the web tier, and the reservation processor may send a conditional update command/instruction to the reservation table, where the condition would be to increase the expiration time as long as the reservation has not already expired (or is still valid). In addition, the reservation extensions cause the update stream to indicate the new or extended expiration time for that reservation, and the expiration processor responsible for that reservation updates or otherwise adds a corresponding entry to its expiration window.

In some embodiments, the web tier may notify the external platform when reservations have expired. In particular, when the external platform attempts to extend a reservation that has already expired, the web tier may provide an error message indicating that the reservation has already been expired. In these cases, the external platform may store the states of individual reservations in a different database system or in another table within the non-relational datastore, and may need to update this other DB/table with the appropriate reservation state (i.e., expired). To facilitate this, the external platform may listen to the update stream being sent by the non-relational datastore to the steam tier. This allows the external platform to obtain the updated reservation states. The external platform listens to the update stream through the web tier (not directly from the non-relational datastore as is the case with the stream tier). This enables the external platform to release reserved items faster than temporary reservations schemes using conventional techniques.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring of the disclosed implementations. Other implementations and applications are also possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods includes more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

As used herein, the term "tenant" may include a group of users who share common access with specific privileges to a software instance. A multi-tenant architecture, such as those discussed herein, may provide a tenant with a dedicated share of a software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 28 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

Figure 1B:
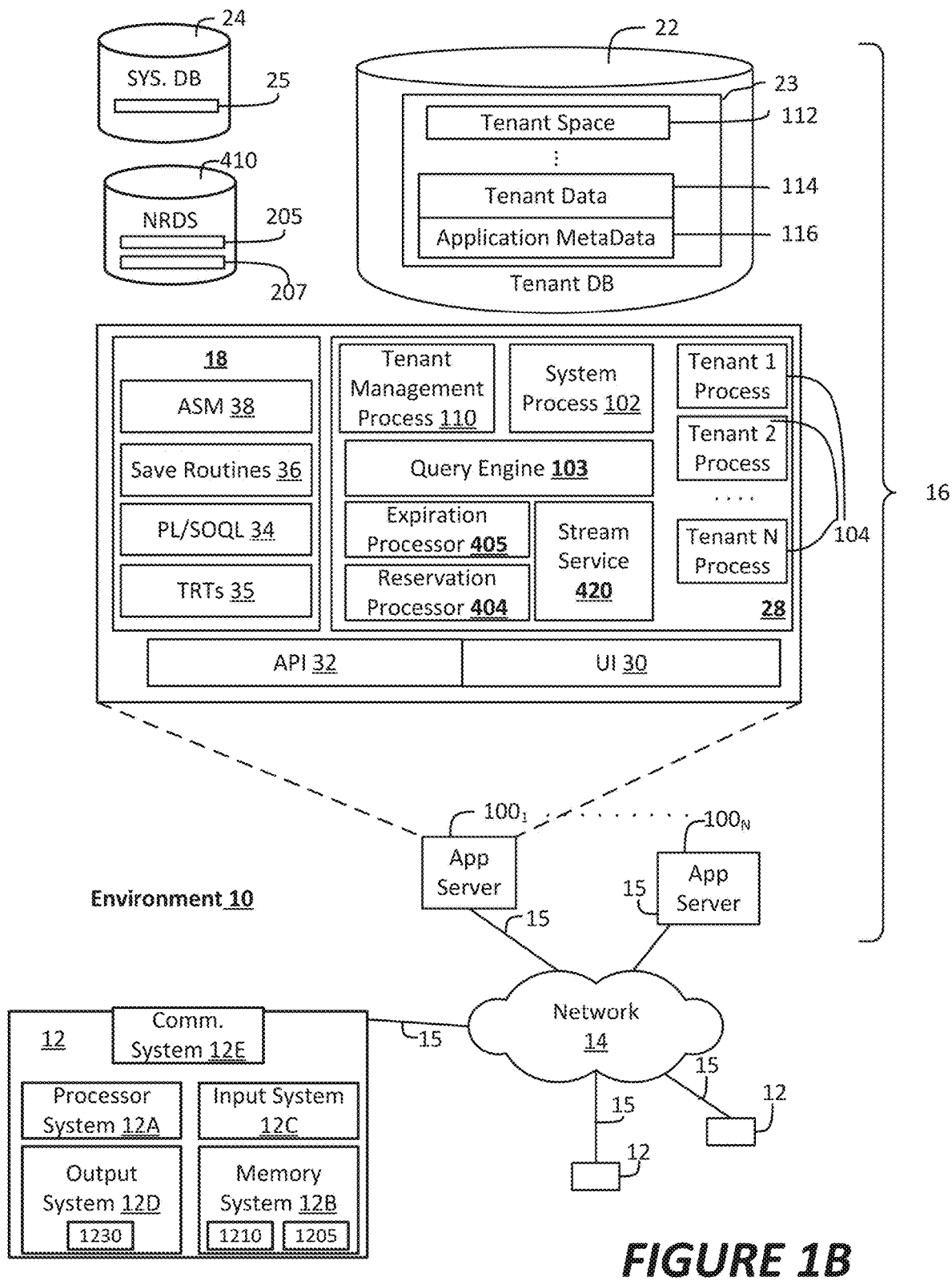
FIG. 1B shows a block diagram of example implementations of elements of FIG. 1A and example interconnections between these elements according to some implementations.

The system 16 may be a multi-tenant database system and/or a cloud computing service comprising a system and/or network of computer devices (e.g., servers, storage devices, applications, etc., such as those discussed with regard to FIGS. 1A-1B infra) that provides access to a pool of physical and/or virtual resources. In some implementations, the system 16 may provide an Infrastructure as a Service (IaaS) platform, a Platform as a Service (PaaS) cloud service platform, and/or other like services.

In embodiments, the tenant data storage 22, the system data storage 24, and/or some other data store (not shown) may include Extract-Load-Transform (ELT) data or Extract-Transform-Load (ETL) data, which may be raw data extracted from various sources and normalized (e.g., indexed, partitioned, augmented, canonicalized, etc.) for analysis and other transformations. In some embodiments, the raw data may be loaded into the tenant data storage 22, the system data storage 24, and/or some other data store (not shown) and stored as key-value pairs, which may allow the data to be stored in a mostly native form without requiring substantial normalization or formatting.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16. The applications of the application platform 18 may be developed with server-side programming languages, such as PHP, Java and/or Java Server Pages (JSP), Node.js, ASP.NET, and/or any other like technology that renders HTML. The applications may be built using a platform-specific and/or proprietary development tool and/or programming languages, such as Salesforce® Apex and/or the like.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a local area network (LAN), a wireless LAN (WLAN), wide area network (WAN), telephone network, wireless network, cellular network, point-to-point network, star network, token ring network, hub network, or other appropriate configuration including proprietary and/or enterprise networks, or combinations thereof. The network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol. The network 14 may comprise one or more network elements, each of which may include one or more processors, communications systems (e.g., including network interface controllers, one or more transmitters/receivers connected to one or more antennas, etc.), and computer readable media. Examples of such network elements may include wireless APs (WAPs), a home/business server (with or without radio frequency (RF) communications circuitry), routers, switches, hubs, radio beacons, (macro or small-cell) base stations, servers (e.g., stand-alone, rack-mounted, blade, etc.), and/or any other like devices/systems. Connection to the network 14 may be via a wired or a wireless connection using one or more of the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. Connection to the network 14 may require that the various devices and network elements execute software routines which enable, for example, the seven layers of the open systems interconnection (OSI) model of computer networking or equivalent in a wireless network.

The user systems 12 can communicate with system 16 using TCP/IP and, at a higher network level, other common Internet protocols to communicate, such as Hypertext Transfer Protocol (HTTP), File Transfer Protocol (FTP), Andrew File System (AFS), Wireless Application Protocol (WAP), Session Initiation Protocol (SIP) with Real-Time Transport Protocol (RTP or Secure RTP (SRTP), Web-based secure shell (SSH), Extensible Messaging and Presence Protocol (XMPP), WebSocket protocol, etc. In an example where HTTP is used, each user system 12 can include an HTTP client commonly referred to as a "web browser" or simply a "browser" for sending and receiving HTTP signals to and from an HTTP server (also referred to as a "web server") of the system 16. In this example, each user system 12 may send and receive HTTP messages where a header of each message includes various operating parameters and the body of the such messages may include code or source code documents, e.g., HTML, Extensible Markup Language (XML), Java Script Object Notion (JSON), Apex®, Cascading Stylesheets (CSS), JavaServer Pages (JSP), MessagePack™, Thrift™ provided by the Apache Software Foundation® ("Apache®"), Abstract Syntax Notation One (ASN.1), Google® Protocol Buffers (protobuf), database objects, or some other like object(s)/document(s). Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device (e.g., Personal Data Assistants (PDAs), pagers, portable media player, etc.), a mobile cellular phone (e.g., a "smartphone"), or any other WiFi-enabled device, WAP-enabled device, or other computing device capable of interfacing directly or indirectly to the Internet or other network (e.g., network 14). The terms "user system", "computing device", "computer system", or the like may be used interchangeably herein with one another and with the term "computer."

As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, and/or the like, to execute and render web applications allowing a user (e.g., a subscriber of on-demand services provided by the system 16) of the user system 12 to access, process and view information, pages, interfaces (e.g., UI 30 in FIG. 1B), and applications available to it from the system 16 over the network 14. In other implementations, each user system 12 may operate a web or user application (e.g., application 1205 in FIG. 1B) designed to interact with applications of the application platform 18 allowing a user (e.g., a subscriber of on-demand services provided by the system 16) of the user system 12 to access, process and view information, pages, interfaces (e.g., UI 30 in FIG. 1B), and applications available to it from the system 16 over the network 14. In some cases, an owner/operator of database system 16 may have pre-built the web or user applications for use by clients, customers, and/or agents of a tenant organization (org) to access a tenant space or enterprise social network of that tenant org. In some cases, developers associated with a tenant org may build custom application(s) for interacting with the tenant data. The user (or third party) application(s) may be native application(s) (e.g., executed and rendered in an application container) or hybrid application(s) (e.g., web applications being executed/rendered in an application container or skeleton). The user (or third party) application(s) may be platform-specific, or developed to operate on a particular type of user system 12 or a particular (hardware and/or software) configuration of a user system 12. The term "platform-specific" may refer to the platform implemented by the user system 12, the platform implemented by the database system 16, and/or a platform of a third party system/platform.

In an example, the user systems 12 may implement web, user, or third party applications to request and obtain data from database system 16, and render graphical user interfaces (GUIs) in an application container or browser. These GUIs may correspond with GUI 1230 and/or UI 30 shown and described with respect to FIG. 1B. In some implementations, the GUIs may include a data analytics GUI, such as Salesforce® Wave™ dashboard, which may provide visual representations of data (also referred to as visual representations 1230 or the like) residing in an enterprise cloud or in an on-demand services environment (e.g., a tenant space within database system 16). The GUIs may include one or more components (e.g., graphical control elements (GCEs), tabs, reports, dashboards, widgets, pages, etc.). Examples of such components may include audio/video calling components, messaging components (e.g., chat, instant messaging, short message service (SMS)/multimedia messaging service (MMS) messaging, emailing, etc.), and visualization components. The visualization components may enable a user of a user system 12 to select visualization parameters (also referred to as "lens parameters" or "filters") for displaying data from one or more datasets. A dataset may be a specific view or transformation of data from one or more data sources (e.g., a tenant space of database 22, etc.). The visualization parameters may include, for example, a selection of data or data type to display from one or more datasets; a particular graph, chart, or map in which to view the selected data; color schemes for the graphs/charts/maps; a position or orientation of the graphs/charts/maps within a particular GUI, etc. The graphs/charts/maps to be displayed may be referred to as a "lens" or a "dashboard". A lens may be a particular view of data from one or more datasets, and a dashboard may be a collection of lenses. In some implementations, a GUI may display lenses, dashboards, and/or control panels to alter or rearrange the lenses/dashboards. Furthermore, the various application(s) discussed herein may also enable the user system 12 to provide authentication credentials (e.g., user identifier (user_id), password, personal identification number (PIN), digital certificates, etc.) to the database system 16 so that the database system 16 may authenticate the identity of a user of the user system 12.

The web, user, or third party application(s) discussed herein may be a software, program code, logic modules, application packages, etc. that are built using website development tools and/or programming languages, such as HTML, CSS, JavaScript, JQuery, and the like; and/or using platform-specific development tools and/or programming languages (e.g., Salesforce® Apex, Salesforce® Visualforce®, Salesforce® Lightning®, Salesforce® Wave™ Dashboard Designer, Salesforce® Force.com® IDE, Android® Studio™ integrated development environment (IDE), Apple® iOS® software development kit (SDK), etc.). Furthermore, such applications may utilize a suitable querying language to query and store information in an associated tenant space, such as Structure Query Language (SQL), object query language (OQL), Salesforce® OQL (SOQL), Salesforce® object search language (SOSL), Salesforce® analytics query language (SAQL), and/or other like query languages.

Each user system 12 typically includes an operating system (OS) to manage computer hardware and software resources, and provide common services for various applications. The OS includes one or more drivers and/or APIs that provide an interface to hardware devices thereby enabling the OS and applications to access hardware functions. The OS includes middleware that connects two or more separate applications or connects applications with underlying hardware components beyond those available from the drivers/APIs of the OS. The OS may be a general purpose operating system or a platform-specific OS specifically written for and tailored to the user system 12.

Each user system 12 also typically includes one or more user input devices, such as a keyboard, a mouse, a trackball, a touch pad, a touch screen, a pen or stylus or the like, for interacting with a GUI provided by the browser/application container on a display (e.g., a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using one or more central processing units (CPUs) and/or other like computer processing devices (see e.g., processor system 12B of FIG. 1B). Similarly, the system 16 (and additional instances of an MTS, where more than one is present) and all of its components can be operator-configurable using application(s) including computer code to run using the processor system 17, which may include one or more CPUs/processors. Examples of the processors/CPUs of processor system 17 may include one or multiple Intel Pentium® or Xeon® processors, Advanced Micro Devices (AMD) Zen® Core Architecture processor(s), such as Ryzen® or Epyc® processor(s), Accelerated Processing Units (APUs), MxGPUs, or the like; ARM-based processor(s) licensed from ARM Holdings, Ltd. such as the ARM Cortex-A family of processors and the ThunderX2® provided by Cavium™, Inc.; Centriq™ processor(s) from Qualcomm® Technologies, Inc.; Power Architecture processor(s) provided by the OpenPOWER® Foundation and/or IBM®; GeForce®, Tegra®, Titan X®, Tesla®, Shield®, and/or other like GPUs provided by Nvidia®; a MIPS-based design from MIPS Technologies, Inc. such as MIPS Warrior P-class processors; and/or the like, or the like.

The system 16 includes tangible computer-readable media having non-transitory instructions stored thereon/in that are executable by or used to program a server (e.g., the app servers 100 or other servers discussed herein) or other computing system (or collection of such servers or computing systems) to perform some of the implementation of processes described herein. For example, computer program code 28 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, an output system 12D, and a communications system 12E.

In FIG. 1B, the network interface 20 is implemented as a set of HTTP application servers $100_1$-$100_N$. Each application server 100 (also referred to herein as an "app server", an "application programming interface (API) server", a "worker node", and/or the like) is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. In various embodiments, the process space 28 includes an reservation processor 404, expiration processor 405, and a stream service processor 420. The reservation processor 404 appends received events 215 to an event log 205 in an non-relational datastore (NRDS) 410, and enforces the ordering of events, idempotence, and constraints. Updates to the event log 205 are streamed from the NRDS 410 to the stream service 420, which are then periodically read by the expiration processor 405. The expiration processor 405 reads temporary reservations from the stream service 420, and expires (or deletes) temporary reservations from the event log 205 when the temporary reservations have expired. These and other aspects are discussed in more detail infra with respect to FIGS. 2-8.

The application platform 18 includes an application setup mechanism (ASM) 38 that supports application developers' ("app developers") creation and management of applications. Such applications and others can be saved as metadata into tenant database 22 by save routines 36 for execution by subscribers as one or more tenant process spaces 104 managed by tenant management process 110, for example. Invocations to such applications can be coded using Procedural Language (PL)/Salesforce® Object Query Language (SOQL) 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

In various embodiments, the application platform 18 includes temporary reservation templates (TRTs) 35. Templates are abstract data types that can be instantiated by tenants/users to employ a particular behavior. The TRTs 35 are templates that allow tenants/users to utilize the temporary reservation embodiments discussed herein without having to know or learn how to implement temporary reservation aspects, such as building and appending events to an event log or how to delete or remove expired reservations. In this way, the tenants/users can instantiate an instance of a particular TRT 35 for a specific use case, and may set or define various parameters that best suits their particular platforms and/or applications. Based on the instance of the particular TRT 35, the system 16 applies some behavior that ensures events are dependent in a consistent performant manner and that the aggregate is computed in a consistent and performant way.

The tenants/users may develop program code, script(s), etc. that instantiate an instance of a particular TRT 35. This code/script(s) may be referred to as a "temporary reservation definition," "temporary reservation configuration," "temporary reservation pattern," and/or the like. The temporary reservation definition may be a configuration or policy that is used to define events and temporary reservation implementations for a particular use case. The temporary reservation definition may define various event types and values to be included the each event type, constraints/conditions for appending the events to an events log, and constraints/conditions for expiring the events or otherwise removing events from the event log. Tenants/developers can configure the temporary reservation definitions both through a suitable API 32 and/or through a web based graphical user interface (GUI) 30. Where APIs 32 are used, the temporary reservation definition may be developed using any suitable mark-up or object notation language, such as the various languages, tools, etc. discussed herein. The developed temporary reservation definition may be pushed or otherwise sent to the system 16 using a suitable API 32 or WS. The system 16 may provide a dev-environment, programming language(s), and/or development tools that allows tenants/developers to create/edit temporary reservation definitions. Examples of such dev-environment, programming language(s), and/or development tool are discussed with regard to FIGS. 1A-1B. In embodiments, the dev-environment may allow the tenants/developers to define multiple events that the system 16 may accept via API/WS 32 requests in response to receipt of suitable messages (e.g., HTTP messages) including or indicating an event. These messages may be generated and sent by the tenant platform based on detection of various user interactions with that platform. When an event takes place or is triggered at the tenant platform, the code/script(s) implemented by the tenant platform may generate and transmit a message indicating the event to the system 16, which may cause the system 16 to append the event to an events log after consistency, idempotence, and uniqueness constraints are validated. The API/WS 32 may be any suitable API/WS 32, such as those discussed herein. In one example, a RESTful API 32 may be used, where a REST API endpoint accepts event messages with event data in a JSON payload. In some implementations, the event messages may be sent in batches, and the API/WS 32 may include separate calls for single and batch event message submissions.

In various implementations, application platform 18 may be, or may include, a development environment, programming language(s), and/or tools (collectively referred to as a "development environment", "dev-environment" and the like) that allows app developers to create/edit applications for implementing the various embodiments discussed herein. As examples, the dev-environment may be or include a software development environment (SDE), an integrated development environment (IDE), a software development kit (SDK), a software development platform (SDP), a schema builder, a modeling language application, a source code editor, build automation tools, debugger, compiler, interpreter, and/or some other like platform, framework, tools, etc. that may assist an app developer in building applications, configurations, definitions, and/or the like. In some implementations, the dev-environment may be a standalone application, or may be a web-based or cloud-based environment (e.g., a native application, a web application, or a hybrid application including GUIs that render an SDE/IDE/SDK/SDP implemented by a backend service (e.g., database system 16, a cloud service provider, etc.) in a web browser or application container).

The system 16 of FIG. 1B also includes a user interface (UI) 30 and an API 32 to system 16 resident processes, which allow users or developers at user systems 12 to access the resident processes. The API 32 may be implemented as a remote API or a web API, such as a Representational State Transfer (REST or RESTful) API, Simple Object Access Protocol (SOAP) API, Apex API, and/or some other like API. The API 32 may be implemented as a web service including, for example, Apache® Axi2.4 or Axi3, Apache® CXF, JSON-Remote Procedure Call (RPC), JSON-Web Service Protocol (WSP), Web Services Description Language (WSDL), XML Interface for Network Services (XINS), Web Services Conversation Language (WSCL), Web Services Flow Language (WSFL), RESTful web services, and/or the like.

In some implementations, the API 32 may include one or more public APIs and one or more private APIs. The public APIs are APIs that includes one or more publically exposed endpoints that allows user systems 12 to access tenant data and temporary reservation datastores. These endpoints specify where resources are located and/or how particular web services can be accessed. The application 1210 may be used to generate and transmit a message (e.g., an HTTP message) with a user-issued query and a suitable URI/URL to access of an endpoint of the system 16. In embodiments, one or more of the public APIs may be an asynchronous ("async") query API, where the user-issued query includes an API call or other like instruction indicating that the query 212 should be treated as an aysnc query (referred to as an "async query verb"). The async query verbs to invoke the async query API may be defined by API 32 and can be coded using PL/SOQL 34 or some other suitable programming or query language. When an async query invokes the async query API, an async query engine (e.g., query engine 103) or async query scheduler may generate a corresponding async query job. The term "job" as used herein refers to a unit of work or execution that performs work that comprises one or more tasks. Individual jobs may have a corresponding job entity comprising a record or database object that stores various values, statistics, metadata, etc. during the lifecycle of the job or until the job is executed, which are placed in a schedule or queue and executed from the queue, in turn. An async query job entity corresponding to an async query job is a job entity existing for the during the lifecycle of an async query, which is placed in a schedule or queue and executed by the async query engine, in turn. The async public API may be implemented as a REST or RESTful API, SOAP API, Apex API, and/or some other like API, such as those discussed herein.

In various embodiments, the public API 32 may be used to place reservations on items for a certain time duration before those items are purchased or otherwise checked out. Such an API 32 may be referred to as a "Reservation Service API" or the like. These reservations may be referred to as "temporary reservations" because such reservations expire if the corresponding item is not purchased or checked out before expiration the time duration. In some implementations, a default expiration time duration may be a predefines value (e.g., 10 minutes), but may be configurable up to a specified period of time (e.g., N number of minutes, where N≤240 minutes). In these embodiments, the Reservation Service API 32 may include a reservation method, such as reserveInventory( ), which may be called by an external platform (e.g., external platform 210 of FIG. 2) that reserves items for a default period of time. Additionally, the reservation method may include an argument to configure the expiration time duration, such as reserveInventory (reservationDurationInMinutes), where reservationDurationInMinutes is the reservation duration in minutes, which specifies how long the reservation should last. The expiration time duration can also be reset by calling the reserveInventory method repeatedly. Additionally, the Reservation Service API 32 may be used to observe whether reservations have expired and/or a current remaining expiration time duration. For example, the Reservation Service API 32 may include an expiration method, such as getInventoryReservationExpiry( ), which returns a timestamp when the reservation for a particular item expires. Furthermore, the Reservation Service API 32 or some other API 32 may include a checkout method, such as startCheckout( ), which may be used to initiate a checkout process for purchasing a reserved item. Invoking such a checkout method may pause, extend, or reset an expiration timer, or may convert a temporary reservation into a permanent reservation, so that a reserved item does not expire while a customer is going through the checkout process. The reservation Service API 32 may include other methods, such as a cancellation method to cancel reservations prior to expiration, and/or the like.

The private APIs are APIs that are private or internal to the system 16, which allows system applications (e.g., tenant management process 110, system process 102, query engine 103, event processor 404, and reservation processor 405) to access other system applications. The private APIs may be similar to the public APIs except that the endpoints of the private APIs are not publically available or accessible. The private APIs may be made less discoverable by restricting users, devices, and/or applications from calling or otherwise using the private APIs. For example, use of the private APIs may be restricted to machines inside a private network (or an enterprise network), a range of acceptable IP addresses, applications with IDs included in a whitelist or subscriber list, requests/calls that include a particular digital certificate or other like credentials, and/or the like. The private APIs may be implemented as a REST or RESTful API, SOAP API, Apex API, a proprietary API, and/or some other like API.

Each application server 100 can be communicably coupled with tenant database 22 and system database 24, for example, having access to tenant data 23 and system data 25, respectively, via a different network connection 15. For example, one application server $100_1$ can be coupled via the network 14 (e.g., the Internet), another application server $100_{N-1}$ can be coupled via a direct network link 15, and another application server $100_N$ can be coupled by yet a different network connection 15. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used. The application servers 100 may access the tenant data 23 and/or the system data 25 using suitable private APIs as discussed previously.

In some implementations, each application server 100 is configured to handle requests for any user associated with any organization that is a tenant of the system 16. In this regard, each application server 100 may be configured to perform various database functions (e.g., indexing, querying, etc.) as well as formatting obtained data (e.g., ELT data, ETL data, etc.) for various user interfaces to be rendered by the user systems 12. Because it can be desirable to be able to add and remove application servers 100 from the server pool at any time and for various reasons, in some implementations there is no server affinity for a user or organization to a specific application server 100. In some such implementations, an interface system implementing a load balancing function (e.g., an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (e.g., in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (e.g., an application server 100 in the system 16) can automatically generate one or more native queries (e.g., SQL statements or SQL queries or the like) designed to access the desired information from a suitable database. To do so, the system 16 (e.g., an application server 100 in the system 16) may include one or more query engines 103, which is/are a software engine, SDK, object(s), program code and/or software modules, or other like logical unit that takes a description of a search request (e.g., a user query), processes/evaluates the search request, executes the search request, and returns the results back to the calling party. The query engine(s) 103 may be program code that obtains a query from a suitable request message via the network interface 20 that calls a public API, translates or converts the query into a native query (if necessary), evaluates and executes the native query, and returns results of the query back to the issuing party (e.g., a user system 12). To perform these functions, the query engine(s) 103 include a parser, a query optimizer, database manager, compiler, execution engine, and/or other like components. In some implementations, each of the illustrated databases may generate query plans to access the requested data from that database, for example, the system database 24 can generate query plans to access the requested data from the system database 24. The term "query plan" generally refers to one or more operations used to access information in a database system.

The query engine(s) 103 may include any suitable query engine technology or combinations thereof. As examples, the query engine(s) 103 may include direct (e.g., SQL) execution engines (e.g., Presto SQL query engine, MySQL engine, SOQL execution engine, Apache® Phoenix® engine, etc.), a key-value datastore or NoSQL database engines (e.g., DynamoDB® provided by Amazon.com®, MongoDB query framework provided by MongoDB Inc.®, Apache® Cassandra, Redis™ provided by Redis Labs®, etc.), MapReduce query engines (e.g., Apache® Hive™, Apache® Impala™ Apache® HAWQ™, IBM® Db2 Big SQL®, etc. for Apache® Hadoop® database systems, etc.), stream/event processing engines or stream analytics engines (e.g., Apache® Kafka®, Storm®, Flink®, Apex®, Spark® (Spark Streaming engine), etc.; IBM® Spade, Nvidia® CUDA™, Intel® Ct™, etc.), relational database (or "NewSQL") engines (e.g., InnoDB™ or MySQL cluster™ developed by Oracle®, MyRocks™ developed by Facebook.com®, FaunaDB provided by Fauna Inc.), PostgreSQL database engines (e.g., MicroKernel Database Engine and Relational Database Engine provided by Pervasive Software®), graph processing engines (e.g., GraphX of an Apache® Spark® engine, an Apache® Tez engine, Neo4J provided by Neo4j, Inc.™, etc.), pull (iteration pattern) query engines, push (visitor pattern) query engines, transactional database engines, extensible query execution engines, package query language (PaQL) execution engines, LegoBase query execution engines, and/or some other query engine used to query some other type of database system (such as any processing engine or execution technology discussed herein). In some embodiments, the query engine(s) 103 may include or implement an in-memory caching system and/or an in-memory caching engine (e.g., memcached, Redis, etc.) to store frequently accessed data items in a main memory of the system 16 for later retrieval without additional access to the persistent data store.

Each database can generally be viewed as a collection of objects, such as a set of logical tables, containing data fitted into predefined or customizable categories. As used herein, a "database object", "data object", or the like may refer to any representation of information in a database that is in the form of an object or tuple, and may include variables, data structures, functions, methods, classes, database records, database fields, database entities, associations between data and database entities (also referred to as a "relation"), and the like. A "table" is one representation of a data object, and may be used herein to simplify the conceptual description of objects and custom objects according to some implementations. It should be understood that "table" and "data(base) object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Referring now to the user system 12 in FIG. 1B, the user system 12 includes a processor system 12A, which can include any suitable combination of one or more processors, such as one or more central processing units (CPUs) including single-core or multi-core processors (such as those discussed herein), graphics processing units (GPUs), reduced instruction set computing (RISC) processors, Acorn RISC Machine (ARM) processors, complex instruction set computing (CISC) processors, digital signal processors (DSP), programmable logic devices (PLDs), field-programmable gate arrays (FPGAs), Application Specific Integrated Circuits (ASICs), System-on-Chips (SoCs) and/or programmable SoCs, microprocessors or controllers, or any other electronic circuitry capable of executing program code and/or software modules to perform arithmetic, logical, and/or input/output operations, or any suitable combination thereof. As examples, the processor system 12A may include Intel® Pentium® or Core™ based processor(s); AMD Zen® Core Architecture processor(s), such as Ryzen® processor(s) or Accelerated Processing Units (APUs), MxGPUs, or the like; A, S, W, and T series processor(s) from Apple® Inc.; Snapdragon™ processor(s) from Qualcomm® Technologies, Inc., Texas Instruments, Inc.® Open Multimedia Applications Platform (OMAP)™ processor(s); MIPS Warrior M-class, Warrior I-class, and Warrior P-class processor(s) provided by MIPS Technologies, Inc.; ARM Cortex-A, Cortex-R, and Cortex-M family of processor(s) as licensed from ARM Holdings, Ltd.; GeForce®, Tegra®, Titan X®, Tesla®, Shield®, and/or other like GPUs provided by Nvidia®; and/or the like.

The memory system 12B can include any suitable combination of one or more memory devices, such as volatile storage devices (e.g., random access memory (RAM), dynamic RAM (DRAM), etc.) and non-volatile memory device (e.g., read only memory (ROM), flash memory, etc.). The memory system 12B may store program code for various applications (e.g., application 1205 and/or other applications discussed herein) for carrying out the procedures, processes, methods, etc. of the embodiments discussed herein, as well as an operating system (OS) 1205 and one or more databases or database objects (not shown).

The OS 1205 manages hardware and software resources of the user system 12, and provides common services for the applications via one or more drivers and/or APIs that provide an interface to hardware devices thereby enabling the OS 1205 and applications to access hardware functions. The OS 1205 or some other code stored in memory system 12B may include middleware that connects two or more separate applications or connects applications with underlying hardware components beyond those available from OS and/or the drivers/APIs. The OS may be a general-purpose operating system or an operating system specifically written for/tailored to the user system 12.

The application 1210 is a software application designed to run on the user system 12 and is used to access data stored by the database system 16. The application 1210 may be platform-specific, such as when the user system 12 is implemented in a mobile device, such as a smartphone, tablet computer, and the like. The application 1210 may be a native application, a web application, or a hybrid application (or variants thereof). The application 1210 may be developed using any combination of one or more programming languages, including an object oriented programming language such as Python, PyTorch, Ruby, Scala, Smalltalk, Java™, C++, C#, Rust, or the like; a procedural programming languages, such as the "C" programming language, the Go (or "Golang") programming language, or the like; a scripting language such as JavaScript, Server-Side JavaScript (SSJS), PHP, Pearl, Python, PyTorch, Ruby or Ruby on Rails, Lua, Torch/Lua with Just-In Time compiler (LuaJIT), Accelerated Mobile Pages Script (AMPscript), VBScript, and/or the like; a markup language such as HTML, XML, wiki markup or Wikitext, Wireless Markup Language (WML), etc.; a data interchange format/definition such as Java Script Object Notion (JSON), Apache® MessagePack™, etc.; a stylesheet language such as Cascading Stylesheets (CSS), extensible stylesheet language (XSL), or the like; an interface definition language (IDL) such as Apache® Thrift, Abstract Syntax Notation One (ASN.1), Google® Protocol Buffers (protobuf), etc.; or some other suitable programming languages including proprietary programming languages and/or development tools, or any other languages or tools as discussed herein. In some implementations, the application 1210 may be developed using platform-specific development tools and/or programming languages such as Salesforce® Apex, Salesforce® Visualforce®, Salesforce® Lightning®, Salesforce® Wave™ Dashboard Designer, Salesforce® Force.com® IDE, Android® Studio™ IDE, Apple® iOS® SDK, etc. Suitable implementations for the OS 1205, databases, and applications 210, as well as the general functionality of the user system 12 are known or commercially available, and are readily implemented by persons having ordinary skill in the art, particularly in light of the disclosure herein.

The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks. The output system 12D is used to display visual representations and/or GUIs 1230 based on various user interactions.

The communications system 12E may include circuitry for communicating with a wireless network or wired network. Communications system 12E may be used to establish a link 15 (also referred to as "channel 15," 'networking layer tunnel 15," and the like) through which the user system 12 may communicate with the database system 16. Communications system 12E may include one or more processors (e.g., baseband processors, network interface controllers, etc.) that are dedicated to a particular wireless communication protocol (e.g., WiFi and/or IEEE 802.11 protocols), a cellular communication protocol (e.g., Long Term Evolution (LTE) and the like), a wireless personal area network (WPAN) protocol (e.g., IEEE 802.15.4-802.15.5 protocols, Bluetooth or Bluetooth low energy (BLE), etc.), and/or a wired communication protocol (e.g., Ethernet, Fiber Distributed Data Interface (FDDI), Point-to-Point (PPP), etc.). The communications system 12E may also include hardware devices that enable communication with wireless/wired networks and/or other user systems 12 using modulated electromagnetic radiation through a solid or non-solid medium. Such hardware devices may include switches; filters; amplifiers; antenna elements; wires, ports/receptacles/jacks/sockets, and plugs; and the like to facilitate the communications over the air or through a wire by generating or otherwise producing radio waves to transmit data to one or more other devices, and converting received signals into usable information, such as digital data, which may be provided to one or more other components of user system 12. To communicate (e.g., transmit/receive) with the database system 16, the user system 12 using the communications system 12E may establish link 15 with network interface 20 of the database system 16.

In other implementations, the environment 10 may not have the same elements as those listed above or may have other elements instead of, or in addition to, those listed above.

II. Temporary Reservation Embodiments

Figure 2:
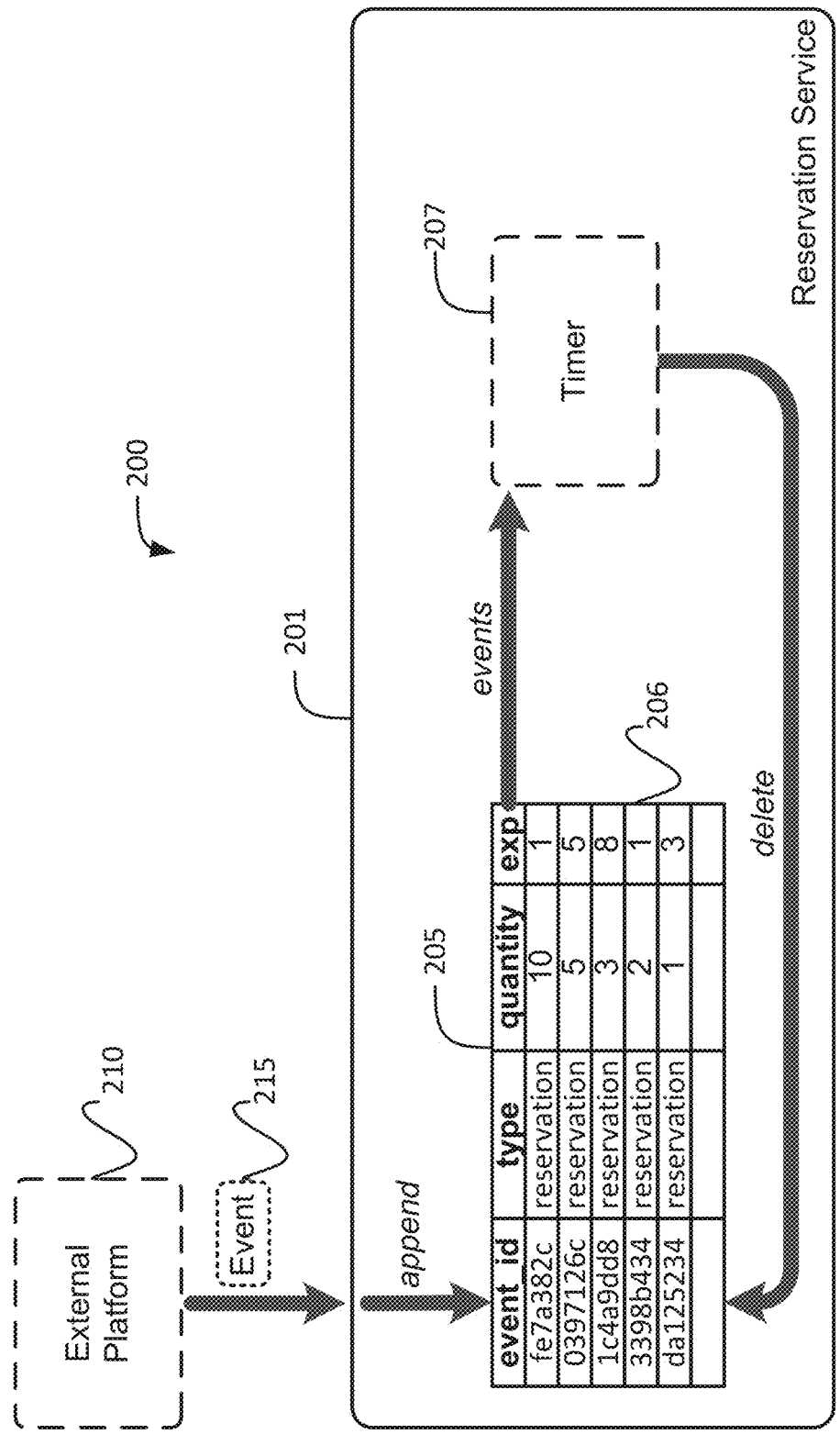
FIG. 2 shows a high level overview of temporary reservations according to various embodiments.

FIG. 2 illustrates a high level overview of temporary reservations according to various embodiments. As shown by FIG. 2, the temporary reservations example 200 includes an reservation service (RS) 201, which receives events 215 from external platforms 210, appends those events 215 to an event log 205, and expires the events 215 accordingly. An example use case of the temporary reservations example 200 involves the external platform 210 being an business-to-consumer (B2C) web platform ("B2C service 210") running a flash or hype sale, and the RS 201 being an inventory service ("inventory service 201").

The RS 201 uses a non-relational datastore (e.g., such as NRDS 410 of FIGS. 1B and 4-5) to persist (or store) the events 215 and runs a timer 207 to expire temporary reservations 206 in the event log 205. An event 215 is an object that is shared between at least two processes. A process being operated by the external platform 210 sends a message including an event 215 to the RS 201, where the act of sending an event 215 message is referred to as a "publish" or as "publishing an event." As used herein, an event message is a message that contains data about an event 215, and is sometimes referred to as an "event notification." One or more processes of the RS 201 subscribe to the event 215 and/or the external platform 210 and listen for the publish of the event 215.

When an event 215 is received from the external platform 210, the RS 201 appends the event 215 into an event log 205 as the next row/record 206 in the event log 205. In various embodiments, the RS 201 supports temporary reservations via the Reservation Service API 32. Internally, each reservation is stored as an event object 206 (also referred to as a "reservation 206"), which corresponds to an individual row or record in the event log 205 and indicates individual items that are reserved (e.g., a quantity of a particular item identifier (item_id) at a particular location or location group). The events 215 are stored as event objects 206 in the event log 205 via an temporary reservation pattern, which is discussed in more detail with respect to FIG. 3. In some embodiments, the reservations may be state machines that track individual item states.

As shown by FIG. 2, the event log 205 includes various fields, such as an event identifier (event_id) field, an event type field, and an expiration (exp) field. The event_id may be assigned by the external platform 210 or may be generated by the RS 201 based on rules/instructions provided by the order service 210. For example, the order service 20 may develop an TRT 35, which indicates how an event_id is to be generated (e.g., using a suitable hash function or the like) to ensure that the event_id is unique when an event 215 is appended to the event log 205. This allows idempotence to be enforced by the system. For example, if the external platform 210 sent the fifth event with an event_id of "da125234" right before a network error occurred resulting in an error message being received by the external platform 210, and the order service 210 were to send that event 215 to be appended again, the RS 201 would ensure that this event 215 is not appended to the event log 205 again. Instead, the RS 201 would send a response message to the external platform 210 indicating that this event 215 has already been appended to the event log 205. This response message may include the event_id and/or other like information including information in the event record.

The exp field in each event object 206 stores an expiration time (e.g., in milliseconds) after which the reservation should be canceled. In some embodiments, the exp_time field may store a timestamp of when a reservation is placed (e.g., when a corresponding event 215 was submitted by the external platform 210), which may then be compared with a current time to determine whether the reservation has expired. Other fields may be included in the event log 205 and/or the aggregate table 207 based on the particular use case being implemented.

According to various embodiments, some or all of the events 215 are temporary reservations. In these embodiments, a base type, "expirable," designates one of the fields in the event log 205 as the exp field, which may then be extended by the external platform 210 with a custom reservation object type. As shown, the RS 201 includes a timer 207 that periodically or continuously expires reservations in the event log 205 based on their expiration times. When the RS 201 detects that a temporary reservation is appended to the event log 205, those event objects 206 are read into the timer 207 on a periodic or asynchronous basis to determine when the object expires. The timer 207 determines when the temporary reservations have expired and deletes those reservations from the event log 205. These aspects are discussed in more detail infra.

Figure 3:
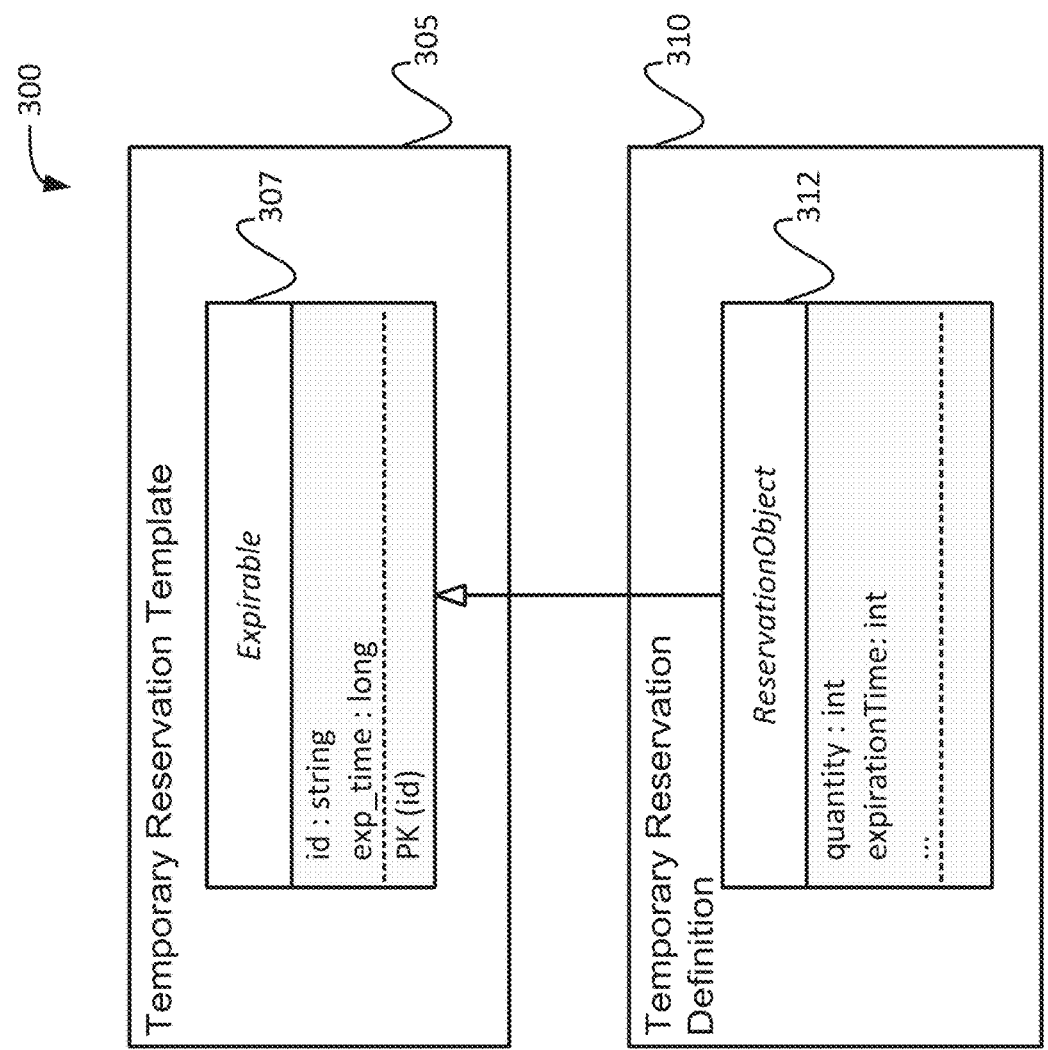
FIG. 3 shows an example UML diagram for carrying out various embodiments discussed herein.

FIG. 3 shows an example UML diagram 300 for carrying out various embodiments discussed herein. The UML diagram 300 has the following graphical characteristics. A box in the UML diagrams represents a class. A class is shown with three compartments. The top compartment indicates the class name or label. The middle compartment holds a list of attributes. An "attribute" is a typed element representing a property of a class, and a typed element implies that the element can only refer to a constrained set of values. In other words, an attribute is a significant piece of data containing values that describe each instance of that class, and are also referred to as fields, variables, instance variables, properties, data types, etc. The bottom compartment holds a list of methods, functions, operations, etc. that provide the functionality of the class. A relationship between two classes is shown by a line with an arrowhead at one end of the line. The end of the line without the arrowhead is the source model element that has a pointer to the target model element. The association end(s), specifies the role that the object at one end of a relationship performs. Each end of a relationship may or may not have properties that specify the role, multiplicity, visibility and navigability. A generalization relationship is shown as a line with a hollow triangle as an arrowhead. A generalization relationship indicates a relationship in which a child class inherits from a parent class. A generalization relates a specific model element to a more general model element, and is owned by the specific model element. The specific model element may be fully consistent with the general model element and adds additional information. The arrowhead points to the entity representing the general classifier and the end of the line without the arrowhead is the specific classifier. A hollow diamond attached to the end of a relationship is used to indicate an aggregation, where the diamond is attached to the class that is the aggregate. An aggregation is a special type of association in which objects are assembled or configured together to create a more complex object. Aggregation protects the integrity of an assembly of objects by defining a single point of control called aggregate, in the object that represents the assembly. A filled diamond attached to the end of a relationship line is used to indicate a composite aggregation, where the diamond is attached to the class that is the composite. A composite aggregation is a strong form of aggregation that requires a part instance to be included in at most one composite at a time. If a composite is deleted, all of its parts are deleted as well.

Referring now to FIG. 3, which shows an example UML diagram 300 of a temporary reservation template according to various embodiments. The UML diagram 300 shows the various classes (including their attributes and operations/functions) and the relationships among objects for the temporary reservation template (TRT) 305. The TRT 305 may correspond to the TRTs 35 discussed previously with regard to FIG. 1B.

In FIG. 3, the TRT 305 includes a base type class Expirable 307. In embodiments, the Expirable 307 class may be an abstract type (e.g., an object that cannot be instantiated directly) or interface (e.g., an object with no or incomplete implementations). The Expirable 307 specifies attributes including an event ID (ID) and an expiration time (exp). The Expirable 307 also defines operations including a primary key (PK), where the PK includes the ID which has to be unique.

Using the TRT 305, clients or users of the system 16 (e.g., user systems 12) may define an temporary reservation definition (TRD) 310 with concrete classes that extend corresponding base (abstract) classes in the TRT 305. The TRD 310 may correspond with the temporary reservation definition discussed previously with regard to FIG. 1B. The TRD 310 comprises a concrete class (e.g., an instantiation of the abstract classes of TRT 305) including a reservation object (ReservationObject) 312, where the Expirable 307 inherits the behavior of the ReservationObject 312.

The clients/users (e.g., external platform 210) define the ReservationObject 312 to indicate the different types of fields and data types for those fields that can be appended to the event log 205. In the example shown by FIG. 3, a client (e.g., an owner or developer of the external platform 210) may define the ReservationObject 312 to indicate domain-specific fields including a quantity and an expiration time (expiration Time). The expirationTime indicates a time or timestamp when the corresponding reservation is to be expired. In embodiments, the RS 201 knows that the reservation is an expirable event 215 when the event 215 includes an expirationTime field having a non-zero value, and the RS 201 looks at the exp_time field to know when instances of this object expire. Additionally or alternatively, clients/users (e.g., external platform 210) may define one or more constraints for appending temporary reservation events 215 to the event log 215.

Figure 4:
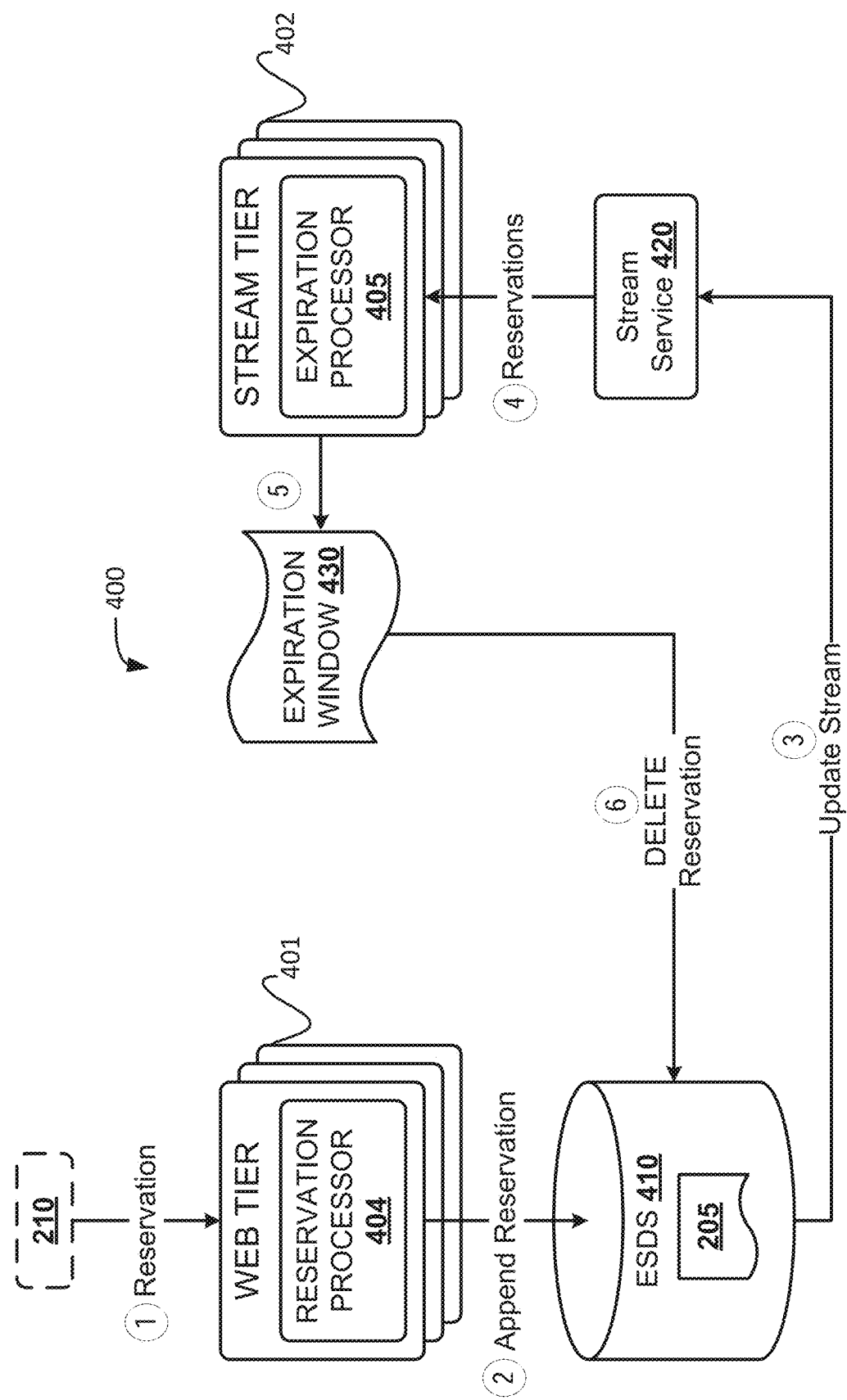
FIGS. 4-5 shows example logical interactions between the elements of FIGS. 1A-3 according to various embodiments. In particular.
Figure 5:
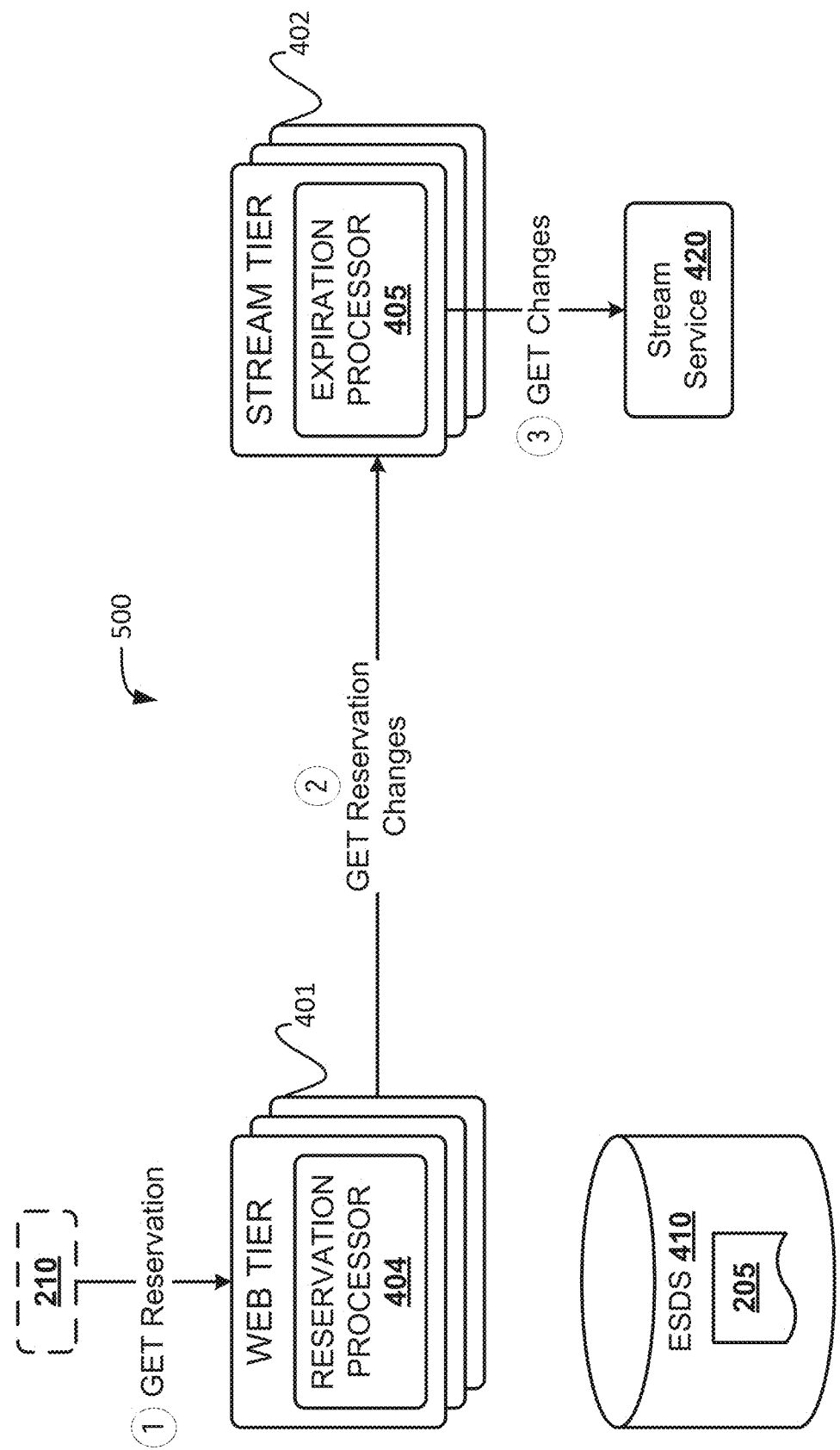

FIGS. 4-5 shows storage services 400 and 500, respectively, illustrating logical interactions between the elements of FIGS. 1A-3 according to various embodiments. In particular, FIG. 4 shows storage service 400 illustrating logical interactions between the elements of FIGS. 1A-3 for appending events to an event log according to various embodiments, and FIG. 5 shows storage service 500 illustrating logical interactions between the elements of FIGS. 1A-3 for getting or otherwise accessing events from the event log according to various embodiments. In FIGS. 4-5, like numbered items are as described with respect to FIGS. 1A-4. The storage services 400 and 500 are standalone service(s) including individual instances of a web tier 401, individual instances of a stream tier 402, a non-relational datastore (NRDS) 410, stream service 420, and expiration window 430. The storage service(s) 400, 500 may be used by other services, such as the external platform 210, over a suitable API 32 (e.g., a private API as discussed previously). In FIGS. 4 and 5, each instance of the web tier 401 includes a respective reservation processor 404 that processes requests received from external platforms/systems 210, and appends events 215 to an event log 205 in the NRDS 410. Additionally, each instance of the stream tier 402 includes a respective expiration processor 405 that identifies expired events 215 and clears the expired events 215 from the NRDS 410.

The individual instances of the web tier 401 (or individual instances of the event processors 404) and individual instances of the stream tier 402 (or individual instances of the reservation processors 405) are implemented as one or more app servers 100, one or more virtual machines (VMs) operating on one or more app servers 100, and/or one or more application containers running in one or more VMs or on a host platform of the app servers 100. In one example, the web tier 401 and stream tier 402 are implemented using Heroku® provided by Heroku, Inc.® where individual instances of the reservation processor(s) 404 and individual instances of the expiration processor(s) 405 run in respective dynos, which are isolated virtualized Unix® containers. In another example, the back-end layer (e.g., including NRDS 410, stream service 420, and expiration window 430) is implemented using Apache® HBase®, and individual instances of the reservation processor(s) 404 and individual instances of the expiration processor(s) 405 run as respective HBase coprocessors.

The reservation processor(s) 404 and expiration processor(s) 405 (collectively referred to as "stream processors" or the like) may be implemented as software components (e.g., software engines, software agents, artificial intelligence (AI) agents, modules, objects, or other like logical units), as individual hardware elements, or a combination thereof. In an example software-based implementation, the stream processors may be developed using a suitable programming language, development tools/environments, etc., which are executed by one or more processors of one or more computing systems (see e.g., processor system 17 of FIG. 1B). In this example, program code of the stream processors may be executed by a single processor or by multiple processing devices. In an example hardware-based implementation, stream processors are implemented by respective hardware elements, such as GPUs (or floating point units within one or more GPUs), hardware accelerators (e.g., FPGAs, ASICs, DSPs, SoCs, etc.) that are configured with appropriate logic blocks, bit stream(s), etc. to perform their respective functions, AI accelerating co-processor(s), tensor processing units (TPUs), and/or the like.

Referring back to FIG. 4, at node 1, the external platform 210 (or an individual user system 12) operates an application that sends an event 215 to the web tier 401. As an example, the external platform 210 may generate and send a temporary reservation event 215 to the web tier 401 based on user interactions with the external platform 210. In some embodiments, the event 215 may be sent to the using the HTTP POST method. A request to append the event 215 to an event log 205 may accompany the event 215, or the event 215 itself may act as a request to append the event 215 to the event log 205. In the inventory example, the inventory event 215 may have a reservation type and may include an expiration time. An example of an inventory event 215 message payload is shown by table 1.

TABLE 1 example event message payload

{
"item_id" : "yeezy",
"id" : "123e4567",
"seq_num": 1,
"type": "reservation",
"exp" : "10",
"location" :
"quantity" : 5
}

In this example, the item_id field is an SKU, the ID field includes a line item ID, the type field is one of an adjustment or reservation, the location field indicates a location from which the event is received, and the quantity field may indicate the amount of an item that is ordered. Additionally, the exp field indicates an expiration time for the reservation in minutes. The web tier 401 receives the events 215, and the reservation processor(s) 404 implements the functionality of appending to the events 215 to the event log 205 in the NRDS 410 at node 2. The reservation processor(s) 404 also enforces ordering of events, idempotence, and user-defined constraints.

In some embodiments, the reservation processor(s) 404 may perform an HTTP POST method to send or stream the events 215 to the NRDS 410 to be included in the event log 205. The HTTP message may invoke an API 32 to insert or append an event 215 to the event log 205. In some embodiments, the API 32 may include an event object, which has a function called "event.insert" or "event.append." The event.insert takes the event 215 without the SN as an input, and returns an SN for that event 215. Other information may be returned for the event 215 as well. Because the reservation processor(s) 404 enforces constraints, it is possible that in the event.insert returns an error indicating that a constraint has been violated or that the event 215 is a duplicate entry. In the inventory example, the returned error may indicate that there is insufficient inventory given the reservation trying to be placed and may return a duplicate together with the original output in error message. In some embodiments, the reservation processor(s) 404 may stream the events 215 to the NRDS 410 using, for example, an asynchronous API 32 that allows the reservation processor(s) 404 to deliver changes to the event log 205 asynchronously and separated by partition. Using a stream-based mechanisms to stream events 215 to the NRDS 410 may be advantageous in high volume and/or high throughput scenarios, such as during flash or hype sales where hundreds of thousands of users of the external platform 210 concurrently place reservations. Using the stream-based approach allows these reservations to be inserted into a single table in the NRDS 410.

Furthermore, as mentioned previously, the external platform 210 may extend or pause a reservation in certain scenarios, such as when a user of the external platform 210 initiates a checkout process. Extending or pausing the reservation may provide the user more time to complete the checkout process without having the reservation expire. In these embodiments, the external platform 210 may send reservation extension messages to the web tier 401 based on certain user interactions with the external platform 210, which indicates event objects 206 (e.g., using event_ids). In some embodiments, the reservation extension messages may also indicate the amount of time each reservation is to be extended. The reservation processor(s) 404 may perform a conditional update operation to update or otherwise change the expiration time in the exp field of the event objects 206 indicated by the reservation extension messages, and with the indicated amount of time (if included in the reservation extension messages). To perform the conditional update operation, the reservation processor(s) 404 may send a query that indicate or instructs the NRDS 410 to increase the expiration time of the indicated event objects 206 provided that those reservation events 215 are still valid according to the original expiration time. In other words, the conditional update query instructs/indicates to update certain event objects 206 with a new expiration time on the condition that those event objects 206 have not yet expired.

The NRDS 410 is a non-relational distributed database structure that includes various database objects that are not stored using relations. For example, the NRDS 410 may be a key-value datastore that stores and manages associative arrays or hash tables. A key-value datastore is a type of non-relational database that stores data in key-value pairs (KVPs), where a key of a KVP is a unique identifier used to retrieve a corresponding value (or set of values) of that KVP. Individual records in the key-value datastore may be a set of one or more KVPs. In these embodiments, each event object 206 stored in the event log 206 is a KVP. Any type of data (e.g., characters, numbers, strings, etc.) can be used as keys and values can be any type of data. Key-value databases are highly partitionable and enable scaling that other types of databases, such as relational databases, cannot achieve. In embodiments, the NRDS 410 may be implemented using DynamoDB® provided by Amazon.com®, MongoDB™ provided by MongoDB Inc.®, Apache® Cassandra™, Apache® HBase™ which runs on top of Apache® Hadoop®, Redis™ provided by Redis Labs™, Oracle NoSQLDatabase™ provided by Oracle Corp.®, and/or the like.

In embodiments, the event log 205 is implemented as a single NoSQL table for high volume reservation scenarios, where the reservation events 215 are inserted into the single table as they are received via the web tier 401. It should be noted that reservation events 215 with expiration times stored in the event log 205 may be referred to as "temporary reservations." In these embodiments, there is no secondary index on this table, and the NRDS 410 distributes portions of the single table uniformly across one or more database clusters or storage nodes. The individual portions of the table may be referred to as "shards" or "partitions." In various embodiments, each shard may comprise a same or similar number of event objects 206. For example, if the event table comprises one hundred shards, then the NRDS 410 will utilize one hundred storage nodes to store the data. Each of the storage nodes comprises one or more storage servers and one or more data storage devices. By uniformly distributing the event table across multiple storage nodes as reservation volume increases, allows the system 16 to be scalable since the number and size of physical hardware resources is the only limit to the number of shards that can be inserted.

When the event 215 is written into the NRDS 410, the request for appending the event 215 is completed from the perspective of the external platform 210. In some embodiments, the reservation processor(s) 404 may send a suitable response message to the external platform 210 indicating that the event was successfully appended to the event log 205 (e.g., an HTTP Response message with a suitable status code). A payload portion of the response message may include the information returned from calling the event.insert, such as the SN and/or other returned information.

At node 3, a stream is processed asynchronously by the stream service 420. The stream service 420 is an object, application, process, software engine, or other like entity that reads an immutable ordered stream of updates made to the NRDS 410. In embodiments where the NRDS 410 is implemented using DynamoDB®, the stream service 420 may be implemented using DynamoDB Streams provided by Amazon.com®. An item or data entry is written to the stream service 420 when an update is performed on the NRDS 410, such as when the reservation processor(s) 404 append reservation events 215 to the event log 205. The stream service 420 captures a time-ordered sequence of item-level modifications in an NRDS 410 table, such as temporary reservations appended to the event log 205, and stores that sequence of modifications as stream records for a predefined period of time. In some implementations, the NRDS 410 may be a producer that asynchronously pushes data to the stream service 420, and one or more consumers process the data in real time. In these implementations, the consumers may be the expiration processor(s) 405, which obtain the pushed data at node 4.

At node 4, the expiration processor(s) 405 access a series of stream records in near real time. In some implementations, the expiration processor(s) 405 may access the stream records using an HTTP GET method. The expiration processor(s) 405 may retrieve or otherwise obtain temporary reservations from the stream service 420 in chunks, batches, or shards. In very high volume or high event ingestion scenarios, the expiration processor(s) 405 may obtain large chunks or batches of events 215 out of the stream service 420, for example, a thousand reservations per second. The events 215 that originate from that asynchronous stream are loaded into the expiration processor(s) 405, and the expiration processor(s) 405 evaluates the contents of the event objects 206 to determine if those events 215 are temporary reservations based on, for example, an expiration field in the event objects 206. When the events 215 are determined to be temporary reservations, the expiration processor(s) 405 store those events 215 in an expiration window 430 at node 5. In other words, the expiration processor(s) 405 continuously obtains change records off the stream service 420, and places those change records in the expiration window 430 (also referred to as an "expiration index" or the like).

The expiration window 430 is a process that keeps track of the expiration of individual reservations and/or shards by time. In embodiments, the expiration window 430 implements a queue and/or key-value datastore to store a mapping of event IDs to expiration time in a local memory system. In alternative embodiments, the expiration window 430 may store a mapping of sequence numbers to expiration time in the local memory system. In these embodiments, the expiration window 430 periodically polls the queue for the smallest sequence number and a checkpoint of a previous sequence number. In some embodiments, the expiration window 430 may need a separate queue of completed records to know the previous sequence number.

In various embodiments, the expiration window 430 may expand or grow in size as the number of ingested temporary reservations increases. In these embodiments, the expiration window 430 is ephemeral such that the expiration window 430 is in memory completely or the expiration window 430 is in memory and partially spills to an ephemeral disk on the process that it is running on. In some embodiments, individual instances of the expiration window 430 and/or expiration processors 405 may correspond to individual shards. For example, if the NRDS 410 comprises one hundred partitions for the event log 205, then there may be one hundred expiration processors 405 running concurrently, where each of the one hundred expiration processors 405 keep a relatively small in-memory expiration window 430 to keep track of expirations for a respective shard. As an example, if one hundred thousand (100 k) records per second are received with a maximum expiration time of 4 hours and a size of 50 bytes per record/KVP (e.g., including event ID and expiration time or timestamp), then the maximum amount of storage resource utilization is 67 gigabytes (GB) of data (e.g., 100 k records*60 seconds*60*4 hours*50 bytes/1024/1024/1024=67 GB). In this example, if the average expiration time is around 10 minutes, then the expected storage size is closer to 2.8 GB. This memory load would then be spread across individual instances of the stream tier 402 (i.e., individual virtual or physical app servers 100 with respective expiration windows 430). At 100 k records per second and at least ten instances of the stream tier 402 are used to process temporary reservations, then the average memory resources needed on each virtual or physical app servers 100 would be at most 6.7 GB for 4 hour expiration times and 0.28 GB for 10 minute expiration times, respectively.

In some embodiments, the expiration window(s) 430 may be implemented using a suitable cache system, such as an in-memory data store, a cache service, and/or dedicated (physical or logical) memory area or region that may be used to store resources. In some embodiments, the cache system or the expiration processor(s) 405 may implement an in-memory caching engine (e.g., memcached, Redis, etc.) to store the temporary reservations in the cache. In some embodiments, the cache system may be, or may include, a web or database caching system/service implemented by the system 16. In most embodiments, the cache system comprises a reserved section (or set of memory locations) of a memory system of the app servers 100. In some implementations, the cache may include or may be embodied as one or more cache memory devices that the processor system 17 can access more quickly than other types of memory (e.g., such as an on-die cache, an on-processor cache, or an off-die cache that resides on same system on chip (SoC), system in package (SiP) as the processor system 17). In embodiments where the NRDS 410 is implemented using DynamoDB®, the cache 430 may be implemented using DynamoDB Accelerator (DAX) provided by Amazon.com®. Other caching systems, such as Redis® provided by Redis, Inc.®, Memcached, Ehcache™ provided by Terracotta, Inc.®, and the like, may be used in other embodiments. In any of the aforementioned embodiments, the expiration window 430 may store the event object to expiration time mapping using the same data structure (e.g., as KVPs).

In addition to continuously loading temporary reservations into the expiration window 430, at node 6 the expiration processor(s) 405 run periodic jobs to expire (e.g., delete) temporary reservations in the event log 205. In these embodiments, the expiration processor(s) 405 retrieve temporary reservations from the expiration window 430 by their expiration time. For example, the expiration processor(s) 405 query their expiration windows 430 for temporary reservations that are currently expired or are about to expire in within a certain amount of time from a current time. The reservation processor(s) 405 then executes a conditional delete for the returned temporary reservations against the NRDS 410 using, for example, one or more suitable messages (e.g., HTTP messages). The conditional delete of the temporary reservations may be a query that indicates or instructs the NRDS 410 to delete listed event objects 206 provided that the expiration time in the exp field is still what is included in the table index. One purpose of the conditional delete is to ensure that extended or paused reservation are not inadvertently expired. As discussed previously, the external service 210 may extend or pause the temporary reservations due to, for example, a user (e.g., using a user system 12) of the external platform 210 initiating a checkout process or the like. In these scenarios, if the temporary reservation is not extended or paused, the expiration processor 405 may inadvertently delete the reservation while the user is completing the checkout process. As mentioned previously, the reservation processor(s) 404 perform conditional update operations to update certain temporary reservations with a new expiration time on the condition that those event objects 206 have not yet expired. In this way, the reservation processor(s) 404 and the expiration processor(s) 404 potentially compete for expiring or extending temporary reservations, and because strongly consistent conditional updates and conditional deletes are used, one of the reservation processor(s) 404 or the expiration processor(s) 404 are guaranteed to win such a competition.

Additionally, the expiration processor(s) 405 may expire the temporary reservations based on a desired granularity, which may be predefined, configured, or dynamically adjusted according to one or more parameters. Because these reservation events 215 are relatively short lived events 215, a fine grained deletion granularity may be desired. The deletion granularity may be set such that, within a certain time period (e.g., one minute or less) of a temporary reservation expiring, the temporary reservation is actually removed from the NRDS 410. Such a fine grained deletion granularity is something that is either impossible or very difficult to achieve using conventional temporary reservation schemes because these conventional schemes cannot scale as efficiently as the present embodiments. The fine grained deletion granularity is possible using the present embodiment because the expiration windows 430 in each of the expiration processor(s) 405 runs a local job that runs according to a fine deletion granularity (e.g., every 30 seconds or the like) to delete expired reservation events 215.

When an expiration processor 405 attempts to delete a temporary reservation that has been extended or paused (e.g., the conditional delete fails), the expiration processor 405 will simply ignore that temporary reservation and remove it from its expiration window 430 because the new/updated expiration time for that temporary reservation will result in a new event object 206 being delivered to the expiration processor 405 via the stream service 420 at node 3. At that point, the expiration processor 405 will re-add that temporary reservation to the expiration window 430 with its new expiration time. Conversely, when the expiration processor 405 attempts to delete a temporary reservation and that attempt is successful (e.g., the conditional delete succeeds), then the reservation processor(s) 404 will generate and send an error message to the external platform 210 if the external platform 210 were to attempt to prolong the expiration time for that deleted temporary reservation. Such an error message may indicate that the temporary reservation is expired and/or has already been deleted.

Referring back to the expiration window 430, in some embodiments, a data retention policy may be used to persist the mapping of the expiration window(s) 430. For example, in embodiments where the stream service 420 is implemented using DAX, the data retention policy may persist or retain stream records for 24 hours. In another example, in embodiments where the stream service 420 is implemented using Kafka®, then the data retention policy may persist or retain stream records for multiple days or weeks. In these embodiments, additional processes do not need to be implemented in order to persist the expiration windows 430. Persisting the stream records of the expiration windows 430 may be useful to mitigate failure-related issues. For example, in some scenarios, the virtual or physical app servers 100 operating the expiration processors 405 can crash during operation, and a new instance of the stream tier 402 may be started in the same or a different machine that. In this example, the new instance of the stream tier 402 will start processing temporary reservations at essentially the same place where the crashed instance left off. This is possible because the underlying stream records of the expiration windows 430 are persistent and the expiration time is short lived.

When one of the expiration processors 405 fails or terminates and a new steam tier 402 instance is spun up to replace the crashed expiration processor 405, the expiration window 430 is for the crashed expiration processor 405 is rebuilt starting at the last point that was check-pointed by the crashed expiration processor 405. Check-pointing involves marking or otherwise tracking a last record that was processed using some sort of change log or storing a flag in a last processed record. In these embodiments, the expiration window 430 uses a check-pointing process or procedure to track the temporary reservations that have already been expired. The expiration window 430 continuously increases the checkpoint as each reservation is expired, which allows the system to reduce the recovery time needed to recover from a processing failure.

As an example if a first reservation is obtained with an expiration time of t=5, and a second reservation with an expiration time of t=3 is obtained after the first reservation, then at t=3 the second reservation will expire and is then removed from the reservation window 430. In this example, the check-pointing procedure does not checkpoint the expiration window 430 at the second reservation because the first reservation is still in the expiration window 430. When the first reservation expires at t=5, then that reservation is removed from the reservation window 430. At this point, the check-pointing procedure detects that both of the reservations have been removed from the expiration window 430, and the check point can be moved up to the second reservation. In this way, if the event processor 405 crashes, these two reservations do not need to be considered by the new instance of the stream tier 402 that is spun up to take over for the crashed expiration processor 405. As mentioned previously, the expiration time may have a preset threshold or maximum amount (e.g., 240 minutes or 4 hours). Therefore, it will take at most the threshold or maximum expiration time (e.g., 4 hours) for a given reservation to be check-pointed. And because the underlying data retention policy can be set to be at least one day, reservation persistence can be guaranteed even if stream tier 402 instances crash and/or other arbitrary system failures take place.

As an alternative to using the expiration window 430, in some embodiments the expiration time may be set to be the same for all temporary reservations (e.g., 10 minutes), and the expiration processor(s) 405 may simply lag behind the stream of reservation event 215 updates by that amount (e.g., 10 minutes in this case). In these embodiments, the expiration processor(s) 405 may delete each record as it is obtained from the stream service 420 without storing those temporary reservations in the expiration window 430. Example pseudocode for such embodiments is shown by table 2.

TABLE 2 example temporary reservation deletion pseudocode for static expiration time

```
for (Record record : records) {
  if (record.getType( ) == INSERT) {
    long expirationTime = record.getNewImage( ).getLong('expiration_time');
    long delta = expirationTime - System.currentTimeMillis( );
    if (delta > 0) {
      Thread.sleep(delta);
      dynamod.delete("Reservation", record.getNewImage( ).getString('id'));
    }
  }
}
```

Referring now to FIG. 5, which shows storage service 500 illustrating logical interactions between the elements of FIGS. 1A-3 for obtaining expiration times for temporary reservations according to various embodiments.

At node 1, a query may be generated and sent by the external platform 210 to the web tier 401. Such query messages may be transmitted to the web tier 401 at node 1 using a suitable message, such as an HTTP GET message. In embodiments, the query may be generated and sent based on user interactions with a platform of the external platform 210, or queries may be generated and sent on a periodic basis for maintenance of the external platform 210. For example, the external platform 210 (or an application 1205 implemented by a user system 12) may store additional states or data for each temporary reservation in their own databases, and the external platform 210 may wish to clean up those databases after a reservation has expired.

At node 2, a reservation processor 404 in the web tier 401 sends a suitable message (e.g., an HTTP GET message) to an expiration processor 405 in the stream tier 402, which at node 3 reads (or attempts to read) the stream records from the stream service 420. In most cases, the aggregate state 208 is stored in the cache 430 because, as mentioned previously, the cache 430 was pre-populated with the aggregate states 208. The expiration processor 405 obtains the stream records from the stream service 420 using a suitable message (e.g., an HTTP GET message). The read or retrieved stream records and then supplied to the external platform 210 via the reservation processor 404 in the web tier 401.

Figure 6:
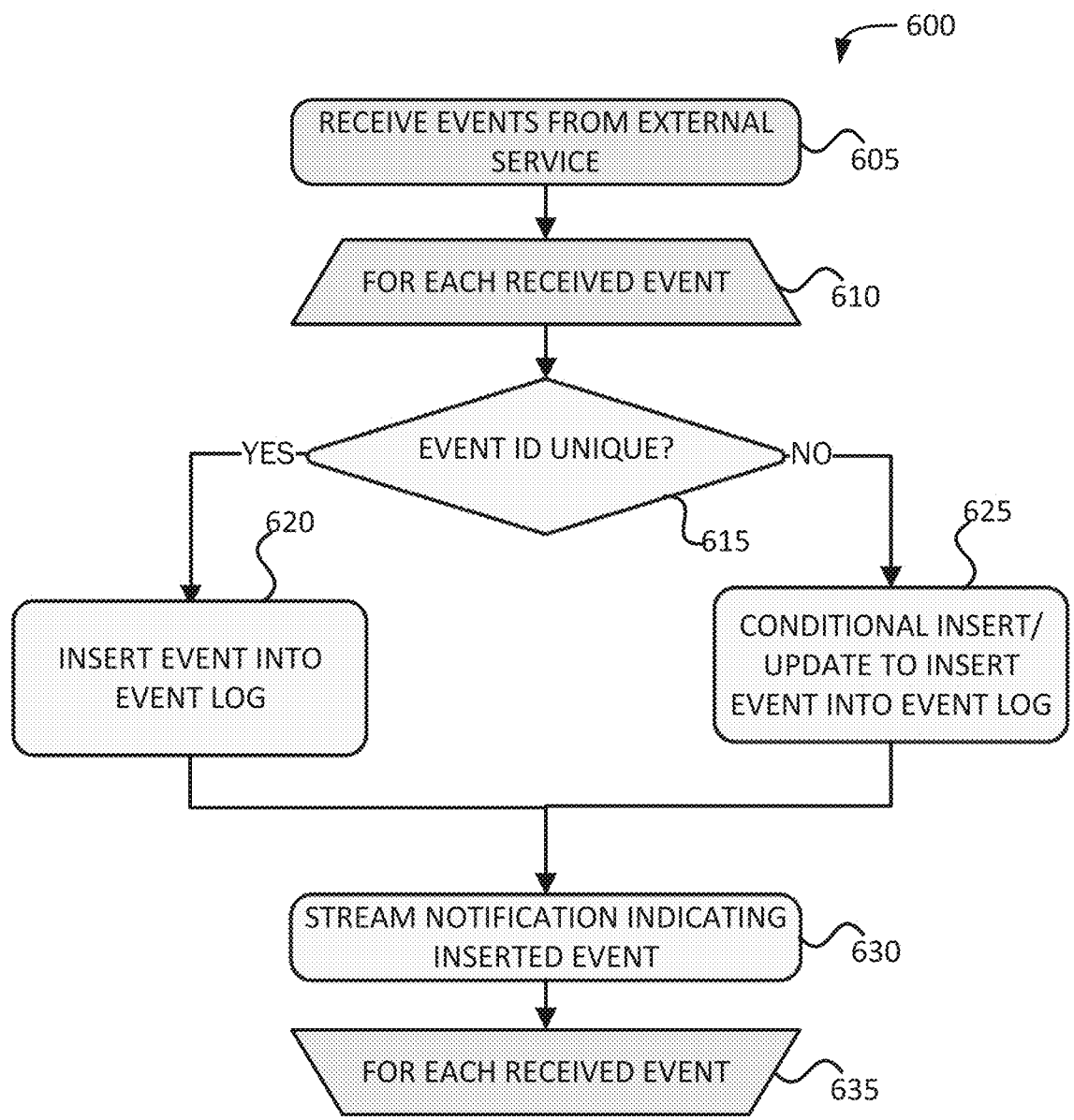
FIG. 6 illustrates a process for appending temporary reservations to an event log according to various embodiments.
Figure 7:
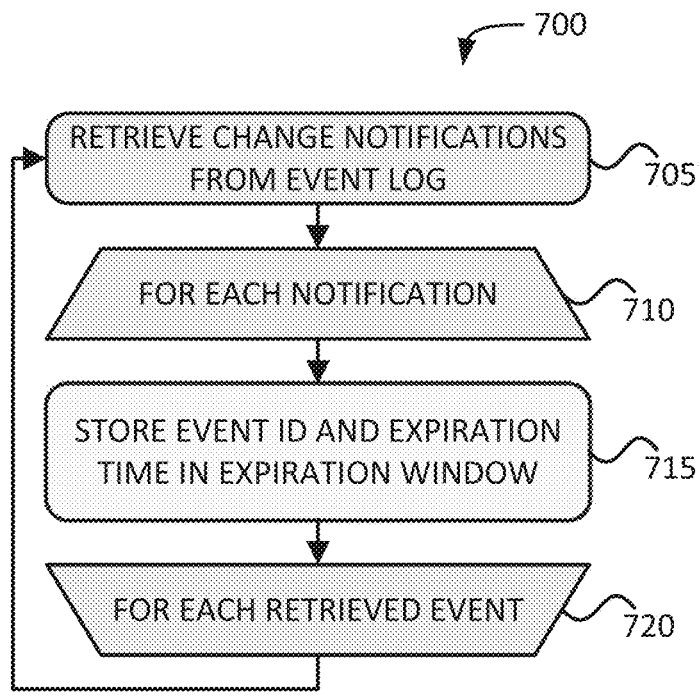
FIG. 7 illustrates a process for storing events in an expiration window according to various embodiments.
Figure 8:
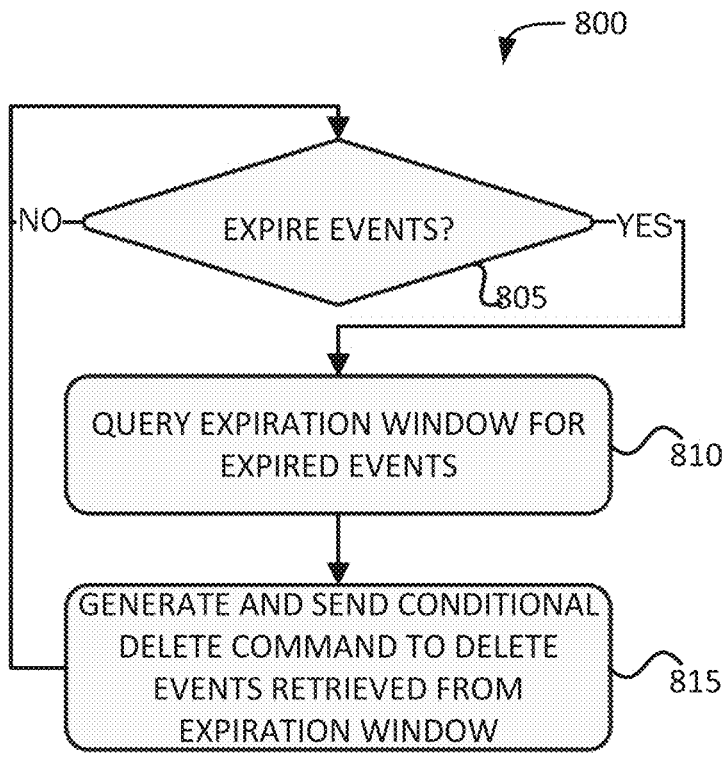
FIG. 8 illustrates a process for expiring events according to various embodiments.

FIGS. 6-8 illustrates processes 600-800, respectively, in accordance with various embodiments. For illustrative purposes, the operations of processes 600-800 are described as being performed by elements/components shown and described with regard to FIGS. 1A-5. However, other computing devices may operate the processes 600-800 in a multitude of implementations, arrangements, and/or environments. In embodiments, the computer system(s) includes program code stored in a memory system, which when executed by a processor system, causes the user computer system(s) to perform the various operations of processes 600-800. While particular examples and orders of operations are illustrated in FIGS. 6-8, in various embodiments, these operations may be re-ordered, separated into additional operations, combined, or omitted altogether.

FIG. 6 illustrates a process 600 for appending events 215 to an event log 205 according to various embodiments. Process 600 begins at operation 605 where an reservation processor 404 receives events 215 from an external platform 210. In embodiments, the events 215 may be temporary reservations, where the event messages sent by the external platform 210 indicate an event_id and an expiration time (ET). At open loop operation 610, the reservation processor 404 processes each received event 215, in turn.

At operation 615, the reservation processor 404 enforces the uniqueness of the event ID for the event 215, such as by comparing the event_id of the event 215 against the event_ids in the event log 205. If at operation 615 the reservation processor 404 determines that the event ID is unique (e.g., the event ID is not already in the event log 205), the reservation processor 404 proceeds to operation 620 to insert the event 215 as an event object 206 in the event log 205. If at operation 615 the reservation processor 404 determines that the event ID is not unique (e.g., the event ID is already in the event log 205), the reservation processor 404 proceeds to operation 625 to perform a conditional insert or conditional update operation to insert the event 215 into the event log 205. In embodiments, the conditional insert/update operation may insert the event 215 into the event log 205 on the condition that the ET of the event object 206 has not already expired. At operation 630, the reservation processor 404 generates notifications indicating the inserted event 215 and streams the notifications to a suitable expiration processor 405. In other embodiments, the notifications are generated and streamed to a suitable expiration processor 405 by some other entity. At operation 635, the reservation processor 404 proceeds to close loop operation 635 to process a next received event 215, if any. After all received events 215 have been processed, the reservation processor 404 repeats the process 600 as necessary or may end.

FIG. 7 illustrates a process 700 for storing events in an expiration window according to various embodiments. Process 700 begins at operation 705 where an expiration processor 405 retrieves change notifications indicating changes to the event log 205, such as when a temporary reservation has been added to the event log 215. The change notifications may include an event_id and an expiration time of the temporary reservations. In embodiments, the change notifications may be streamed from the NRDS 410 to the expiration processor 405 via a stream service 420 as discussed previously. In some embodiments, the expiration processor 405 queries the event log 205 or the stream service 420. If the query is a consistent query, the expiration processor 405 searches through the event log 205, and retrieves the events 215 in the event log 205. At open loop operation 710, the expiration processor 405 processes each streamed notification, in turn. At operation 715, the expiration processor 405 extracts the event_id and the expiration time from the streamed notification, and stores the event_id and expiration time in an expiration window 430. At close loop operation 720, the expiration processor 405 processes a next streamed notification, if any. Once all notifications have been processed, the expiration processor 405 may repeat process 700 as necessary or the process 700 may end.

FIG. 8 illustrates a process 800 for expiring events 215 according to various embodiments. Process 800 begins at operation 805 where the expiration processor 405 determines whether to expire events 215. In embodiments, the expiration processor 405 determines to expire events 215 based on expiration of a timer or in response to some suitable trigger. In some embodiments, the expiration processor 405 determines to expire events 215 a predefined period of time after receiving a change notification from the NRDS 410 via the stream service 420. If at operation 805 the expiration processor 405 determines that it should not expire events 215, the expiration processor 405 loops back to monitor for when it should expire events 215. If at operation 805 the expiration processor 405 determines that it should expire events 215, the expiration processor 405 proceeds to operation 810 to query the expiration window 430 for expired events 215. In embodiments, the query may search for events 215 in the expiration windows 430 having an expiration time that is equal to or earlier than a current system time. In some embodiments, the query may search for events 215 in the expiration windows 430 having an expiration time that is a predefined amount of time from the current system time (e.g., 1 second from the current system time). At operation 815, the expiration processor 405 retrieves expired events based on the query sent at operation 810, and generates and sends a suitable message to the event log to delete the retrieved events 215 from the event log 205. In embodiment, the message may include a conditional delete to indicate that the retrieved events 215 should be deleted on the condition that the events 215 in the event log 205 have not expired or have an expiration time equal to the expiration time for that event 215 in the expiration window 430. After operation 815, the expiration processor 405 may repeat process 800 as necessary or the process 800 may end.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, includes a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. A non-transitory computer-readable media (NTCRM) comprising instructions, wherein execution of the instructions by one or more physical processors is operable to cause the one or more physical processors to:
obtain a plurality of events from an external platform, wherein one or more events of the plurality of events are temporary reservations including original data;
for each temporary reservation obtained from the external platform,
generate at least one new value that is different than original values generated by the external platform, wherein the at least one new value includes an event identifier (event_id), the generating the at least one new value in response to obtaining a corresponding one of the one or more events from the external platform, and:
insert a record with the event_id and a corresponding expiration time into an event log, the event log being distributed across a plurality of shards as individual records for the obtained plurality of events, wherein at least one shard of the plurality of shards is stored by a corresponding storage node, and the at least one shard includes a portion of the event log, and
stream, to a stream service, a notification indicating insertion of the record into the event log, the notification including the event_id and the expiration time of the record; and
access a series of stream records from the stream service, wherein the generation of the event_id, the insertion of the record into the event log, and the streaming the notification thereof is performed by one or more first data processors implemented by the one or more physical processors and the accessing the stream records is performed by one or more second different data processors implemented by the one or more physical processors, monitor respective shards of the plurality of shards for records having an expiration time indicating that a corresponding temporary reservation has expired, the monitoring by the one or more second different data processors, and delete the expired temporary reservations from the respective portions of the event log based on the monitoring, the deleting by the one or more second different data processors.

2. The NTCRM of claim 1, wherein the expiration time is a timestamp indicating when a temporary reservation for a reserved item is to expire or a timestamp indicating when the reserved item was reserved.

3. The NTCRM of claim 1, wherein execution of instructions is further operable to cause the one or more physical processors to:

receive one or more messages including respective events of the plurality of events, the receiving by the one or more first data processors.

4. The NTCRM of claim 3, wherein at least one of the one or more messages includes events of the plurality of events that are temporary reservations that do not include an expiration time value or include a desired expiration time value.

5. The NTCRM of claim 1, wherein:

each shard of the plurality of shards is stored by a corresponding storage node of a plurality of storage nodes, the event log distributed evenly across the plurality of shards, or a quantity of the one or more second different data processors is equal to a quantity of shards of the plurality of shards.

6. The NTCRM of claim 5, wherein each storage node of the plurality of storage nodes is configured to store a same maximum number of records of the event log.

7. The NTCRM of claim 1, wherein execution of instructions is operable to cause the one or more physical processors to:

store the event_id and the expiration time of each temporary reservation indicated by each streamed notification in an expiration window, the expiration window comprising a mapping of event_ids to expiration times for each temporary reservation.

8. The NTCRM of claim 7, wherein execution of instructions is operable to cause the one or more physical processors to:

retrieve, on a periodic basis, temporary reservations from the expiration window and having expiration times that have expired, the retrieving by the one or more second data processors; and perform a conditional delete operation for the retrieved temporary reservations against the event log, the performing by the one or more second data processors, the conditional delete operation indicating to delete the retrieved temporary reservations provided that expiration times of the retrieved temporary reservations in the event log indicates that the retrieved temporary reservations have expired.

9. The NTCRM of claim 1, wherein execution of instructions is operable to cause the one or more physical processors to:

stream, by the one or more first data processors and to the external platform, the notification indicating insertion of the event_id and the expiration time into the event log.

10. A system, comprising:

one or more physical processors to implement one or more first data processors and one or more second data processors that are different than the one or more first data processors;

wherein the one or more first data processors are arranged to:

receive temporary reservations including original data from an external platform, the temporary reservations to expire after expiration of an expiration time, generate new values that are different than original values generated by the external platform, wherein the new values include event identifiers (event_ids), the generating the new values in response to receiving, from the external platform, the temporary reservations, respectively, and append the received temporary reservations as respective event objects in an event log, the respective event objects including the respective event_ids and corresponding expiration times, the event log being distributed across a plurality of shards as individual event objects, wherein at least one shard of the plurality of shards is stored by a corresponding storage node, and different shards of the plurality of shards store different portions of the event log; and wherein the one or more second data processors are arranged to:

receive a stream of notifications, individual notifications in the stream of notifications indicating event objects that were appended, by the one or more first data processors, to the event log, monitor respective shards of the plurality of shards, and delete event objects from the event log corresponding to expired temporary reservations based on the stream of notifications.

11. The system of claim 10, wherein the appending of temporary reservations in the event log by the one or more first data processors is arranged to cause the notifications to be streamed to the one or more second data processors.

12. The system of claim 10, wherein the one or more second data processors comprise at least two individual data processors, which are each arranged to:

send individual deletion commands to delete one or more event objects in the event log independent of other deletion commands of other individual data processor(s) of the at least two individual data processors.

13. The system of claim 12, wherein each shard of the plurality of shards is stored by a corresponding storage node of a plurality of storage nodes, the event log is distributed evenly across the plurality of shards.

14. The system of claim 13, wherein each storage node of the plurality of storage nodes is configured to store a same maximum number of records of the event log.

15. The system of claim 10, wherein the one or more first data processors comprise at least two individual data processors, which are each arranged to:

obtain individual event messages from the external platform independent of other individual data processor(s) of the at least two individual data processors, the event messages to include an expiration time of the temporary reservation.

16. The system of claim 15, wherein the individual notifications include event_ids and expiration times of the temporary reservations indicated by the individual notifications, and the at least two individual data processors are further arranged to:

store, in an expiration window, the event_ids and the expiration times of the temporary reservations indicated by the individual notifications, the expiration window comprising a mapping of event_ids to expiration times.

17. The system of claim 16, wherein the one or more second data processors are arranged to:

retrieve, on a periodic basis, temporary reservations from the expiration window having expiration times that have expired when compared to a current system time; and execute a conditional delete operation for the retrieved temporary reservations against the event log, the conditional delete operation indicating to delete the retrieved temporary reservations provided that expiration times of the retrieved temporary reservations in the event log indicates that the retrieved temporary reservations have expired.

18. The system of claim 10, wherein the one or more first data processors are arranged to:

provide the stream of notifications to the external platform in response to receipt of a request from the external platform.

19. The system of claim 10, wherein a quantity of the one or more second data processors is equal to a quantity of shards of the plurality of shards.

20. The system of claim 19, wherein the one or more physical processors comprise two or more physical processors of two or more physical application servers, virtual machines, or application containers, respectively; and wherein at least one of the one or more first data processors is implemented by at least one first physical processor of the two or more physical application servers, virtual machines, or application containers, and wherein at least one of the one or more second data processors is implemented by at least one second different physical processor of the two or more physical application servers, virtual machines, or application containers.

\* \* \* \* \*